US008565175B2

(12) United States Patent
Fang et al.

(10) Patent No.: US 8,565,175 B2
(45) Date of Patent: Oct. 22, 2013

(54) OUT-OF-GROUP INTERFERENCE REDUCTION IN WIRELESS COMMUNICATION SYSTEMS

(75) Inventors: Yiwei Fang, Hayes Middx (GB); John Thompson, Edinburgh (GB)

(73) Assignee: Fujitsu Limited, Kawasaki (JP)

( * ) Notice: Subject to any disclaimer, the term of this patent is extended or adjusted under 35 U.S.C. 154(b) by 156 days.

(21) Appl. No.: 13/226,074

(22) Filed: Sep. 6, 2011

(65) Prior Publication Data

US 2012/0057540 A1 Mar. 8, 2012

(30) Foreign Application Priority Data

Sep. 6, 2010 (GB) .................................. 1014775.9

(51) Int. Cl.
*H04W 4/00* (2009.01)
*H04W 40/00* (2009.01)

(52) U.S. Cl.
USPC .......................................... 370/329; 455/446

(58) Field of Classification Search
None
See application file for complete search history.

(56) References Cited

U.S. PATENT DOCUMENTS

| 8,064,849 B2* | 11/2011 | Zangi ............................. 455/103 |
|---|---|---|
| 2010/0056215 A1* | 3/2010 | Gorokhov et al. ............. 455/561 |
| 2010/0142471 A1* | 6/2010 | Cheng et al. ................... 370/329 |
| 2010/0311349 A1* | 12/2010 | Koo et al. ................... 455/67.11 |
| 2011/0053633 A1* | 3/2011 | Han et al. ....................... 455/522 |
| 2011/0199986 A1* | 8/2011 | Fong et al. ..................... 370/329 |
| 2011/0275397 A1* | 11/2011 | Guey et al. ..................... 455/509 |
| 2012/0046038 A1* | 2/2012 | Gao et al. ....................... 455/447 |
| 2012/0094710 A1* | 4/2012 | Jia et al. ......................... 455/524 |
| 2012/0120903 A1* | 5/2012 | Kim et al. ...................... 370/329 |
| 2012/0307639 A1* | 12/2012 | Zirwas et al. ................. 370/236 |
| 2012/0329502 A1* | 12/2012 | Frederiksen et al. ......... 455/509 |

FOREIGN PATENT DOCUMENTS

| WO | 2009/136736 | 11/2009 |
|---|---|---|
| WO | 2010/035963 | 4/2010 |
| WO | 2010/064835 | 6/2010 |

OTHER PUBLICATIONS

H. Zhang et al., "Cochannel Interference Mitigation and Cooperative Processing in Downlink Multicell Multiuser MIMO Networks" EURASIP Journal on Wireless Communications and Networking, pp. 222-235, 2004.
F. Boccardi et al., "A Near-Optimum Technique Using Linear Precoding for the MIMO Broadcast Channel"; IEEE International Conference on Acoustics, Speech and Signal Processing, ICASSP 2007, vol. 3, pp. III-17-III-20, Apr. 2007.

(Continued)

*Primary Examiner* — Gregory Sefcheck
*Assistant Examiner* — Joshua Smith
(74) *Attorney, Agent, or Firm* — Myers Wolin, LLC

(57) ABSTRACT

In a MIMO wireless communication system, a plurality of base stations (BSs) are provided each of which can transmit signals to, and receive signals transmitted from, one or more user equipments (UEs). The BSs are also organized into a plurality of groups. In a given group of BSs serving one or more UEs, those serving BSs coordinate with each other to simultaneously transmit signals to the one or more served UEs, and one or more of the served UEs feed back information to one or more of those serving BSs. The fed back information incorporates inter-group noise information related to interference between different BS groups. The method involves processing signals for simultaneous transmission by BSs of a group to one or more UEs served by that group and using the information fed back to the BSs of that group to improve system performance.

13 Claims, 5 Drawing Sheets

Functions of 4
1 Base Station Cooperation Controller
2 Base Stations
3 User Equipment
4 The Function Modular of BSC Controller and BSs
5 Pilot Signal Transmission
6 Receive feedback info from UEs
7 Scheduler to decide which BSs serve which UEs
8 Precoders to use one of our proposed OGI-aware BSC algorithms, e.g. NBBD or MET-NBBD
9 Data Streams Transmission System Architecture of BSC

(56) References Cited

OTHER PUBLICATIONS

Information Society Technolgies; "IST-4-027756 Winner II D.1.1. 2V1.2" [http://www.ist-winner.org/], dated Feb. 2008.
S. Shamai et al.; "Enhancing the Cellular Downlink Capacity via Co-Processing at the Transmitting End"; Proc. VTC 2001 Spring, Rhodes, Greece, vol. 3, pp. 1745-1749, 2001.
S. A. Jafar et al.; "PhantomNet: Exploring Optimal Multicellular Multiple Antenna Systems"; EURASIP Journal on Applied Signal Processing, vol. 5, pp. 591-604, 2004.
G. J. Foschini et al; "Coordinating multiple antenna cellular networks to achieve enormous spectral efficiency"; IEE Proceedings-Communications, vol. 153, No. 4, pp. 548-555, Aug. 2006.
N. Kusashima et al.,; "Fractional Base Station Cooperation Cellular Network"; 7th International Conference on Information, Communications and Signal Processing; IEEE 2009, pp. 1-5, Fig 3.
Intellectual Property Office of United Kingdom Search Report issued for corresponding United Kingdom Patent Application No. GB1014775.9, dated Jan. 11, 2011.

\* cited by examiner

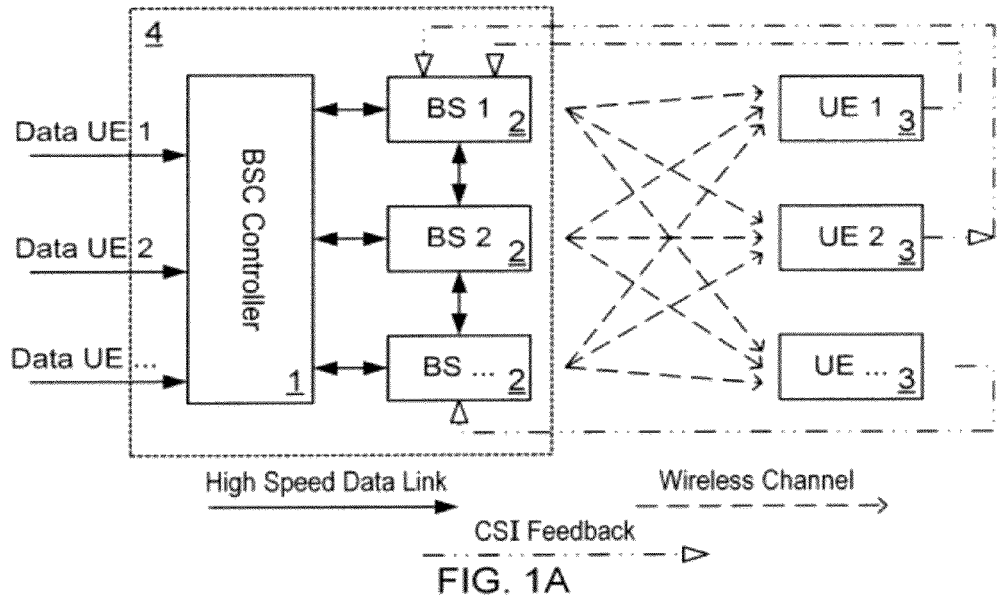

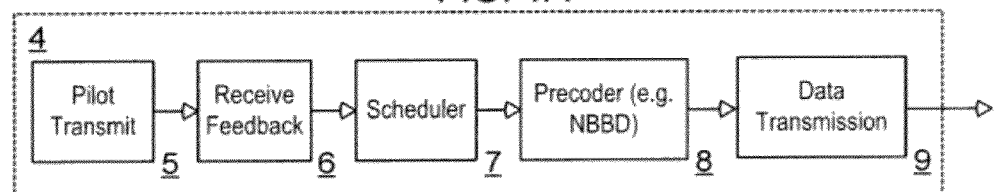

Functions of 4

1 Base Station Cooperation Controller
2 Base Stations
3 User Equipment
4 The Function Modular of BSC Controller and BSs
5 Pilot Signal Transmission
6 Receive feedback info from UEs
7 Scheduler to decide which BSs serve which UEs
8 Precoders to use one of our proposed OGI-aware BSC algorithms, e.g. NBBD or MET-NBBD
9 Data Streams Transmission System Architecture of BSC
FIG. 1B Tier 1 Cell     Tier 2 Cell     Tier 3 Cell
Network with 19 Cell in 3 Tiers The impact of OGI on capacity per UE plotted against transmit power per UE in Tier 1

Capacity per UE vs transmit power per UE comparison for the NB-BD algorithm

Sum capacity of a BSC group plotted against transmit power versus the number of UE Sum capacity of a BSC group plotted against transmission
power per UE comparison

OUT-OF-GROUP INTERFERENCE REDUCTION IN WIRELESS COMMUNICATION SYSTEMS

TECHNICAL FIELD

The present invention relates to wireless communication systems, and in particular to wireless communication systems which use multiple-input multiple-output (MIMO) and Based Station Cooperation (BSC) technologies.

BACKGROUND

Wireless communication systems are widely known in which base stations (BSs) perform radio communication with user equipments (UEs) located within range of the said BSs. The area covered by one or more (typically three) BS(s)—i.e. the geographical region serviced by that/those BS(s)—is generally referred to as a cell, and typically many BSs are provided in appropriate locations so as to cover a wide geographical area more or less seamlessly with adjacent cells. There is a constant need to increase the capacity of such systems and to improve the efficiency of resource utilisation in order to accommodate more users, more data-intensive services and/or higher data transmission rates (i.e. to improve the system transmission capacity).

Orthogonal Frequency Division Multiplexing (OFDM) is one known technique for transmitting data in wireless communication systems. An OFDM-based communications scheme divides data symbols to be transmitted among a large number of frequency subcarriers, hence the description "frequency division multiplexing". Data is modulated onto a subcarrier by adjusting its phase, amplitude or both. The "orthogonal" part of the term OFDM refers to the fact that the spacings of the subcarriers in the frequency domain are chosen so as to be orthogonal, in a mathematical sense, to the other subcarriers. In other words, the sinusoidal waveforms of each subcarrier are eigenfunctions of a linear channel, with the peak of each sinusoid coinciding with a null of every other sinusoid. This can be achieved by making the subcarrier spacing a multiple of the reciprocal of the symbol period.

When individual subcarriers or sets of subcarriers are assigned to different users or user equipments (UEs) in the system, the result is a multi-access system referred to as Orthogonal Frequency Division Multiple Access (OFDMA). The term OFDM is often used to include OFDMA, and vice versa. The two terms may therefore be considered interchangeable for present purposes. By assigning distinct frequency resources (i.e. distinct orthogonal subcarriers) to each UE in a cell, OFDMA can help to reduce interference among the UEs within a given cell.

A means by which basic OFDM schemes are increasingly being improved for increased data rates in wireless communication systems is through the use of so-called multiple-input multiple-output (MIMO) schemes. MIMO schemes employ multiple antennae at the transmitter and/or at the receiver (generally at both) to enhance the data capacity achievable between the transmitter and the receiver. By way of example, in a basic 2×2 MIMO configuration there are two antennae at the transmitter and two antennae at the receiver. Likewise, a basic 4×4 MIMO configuration contains four antennae at the transmitter and four antennae at the receiver. There is no need for the transmitter and receiver to employ the same number of antennae. Typically, a BS in a wireless communication system will be equipped with more antennae in comparison with a UE (which may often be, for example, a mobile handset), owing to differences in power, cost and size limitations.

The term MIMO channel (or simply "channel") is commonly used to describe the frequency response of the transmitter-receiver radio link in a MIMO scheme. The MIMO channel may be represented mathematically as a matrix H, the individual elements of which represent the channel characteristics (for example, channel frequency response) for transmitting signals from one particular transmitting antenna to one particular receiving antenna. For example, the element $H_{b,a}$ of matrix H would represent the channel characteristics for transmitting signals from the $a^{th}$ transmitting antenna of a BS to the $b^{th}$ receiving antenna of a UE.

It should be noted that, despite the name "multiple-input multiple-output", MIMO systems can operate (and indeed provide benefit) even if one of the transmitter and the receiver has only one antenna. In fact, MIMO systems might technically be said to operate even where the transmitter and the receiver both have only one antenna, although this situation might be considered a special (degenerate) case because the MIMO channel would then be represented by a scalar rather than a matrix and a number of the benefits otherwise achievable using MIMO may not be possible.

Unfortunately, achieving high spectral efficiency (or high transmission capacity) by using MIMO schemes in a wireless communication system involves a number of requirements. These include, for example, feedback of channel state information (CSI) from UEs to BSs (this is necessary to provide the BSs with information regarding time-varying changes in the channel and so that the BSs can perform pre-coding, link adaptation etc accordingly). Something else which is so advantageous that it may be thought of as a requirement is the use of a frequency reuse factor of one. However, this level of frequency reuse in particular inevitably leads to inter-cell interference experienced by UEs, particularly those UEs near cell edges (so-called "cell-edge users"). This inter-cell interference may also be referred to as "other cell interference" or OCI (the terms "inter-cell interference" and OCI may be considered synonymous) and can significantly degrade system spectral efficiency.

To elaborate, inter-cell interference or OCI may arise, for example, because the frequency resources (i.e. the carriers and subcarriers) utilised by base stations transmitting data to UEs in one cell are identical to the frequency resources utilised by nearby base stations transmitting data to UEs in an adjacent cell. In other words, there is 1:1 frequency reuse between adjacent cells. As a result of this, for a cell-edge user UE, the distance to a base station currently serving that UE may be roughly the same as, or only marginally different to, the distances to base stations that are in adjacent cell(s). Consequently, from the point of view of that cell-edge user UE, the signal strength received from the serving base station may be only marginally stronger than, or approximately the same as, the signal strength from the base stations in the adjacent cell(s). And because common frequency resources are used in adjacent cells, signals being transmitted in the adjacent cells can often interfere with data being transmitted to the cell-edge user UE in its cell.

In recent years, a technology referred to as Base Station Cooperation (BSC) has been proposed to address the problem posed by OCI. Previous proposals relating to BSC have generally suggested coordinating transmissions between BSs of adjacent or nearby cells to eliminate or reduce OCI. One form of downlink scheme proposed for BSC is commonly referred to as "Joint Transmission".

In Joint Transmission, data to a single UE is simultaneously transmitted from multiple transmission points (i.e. from multiple BSs) in a cooperative manner that is adapted to improve the received signal quality at the UE and cancel interference caused by OCI. The Joint Transmission category of BSC enables "networked" MIMO transmissions by setting up cooperation between geographically separated BSs. The present invention is primarily concerned with BSC schemes which fall into this Joint Transmission category, and hereafter the term "BSC" refers to this.

It has been shown that BSC has the potential to be enormously effective in terms of OCI suppression and thus to improve overall system throughput. See, for example, the following document which may be considered a useful reference:

H. Zhang and H. Dai, "Cochannel interference mitigation and cooperative processing in downlink multicell multiuser MIMO networks," EURASIP Journal on Wireless Communications and Networking 2004:2, pp. 222-235 (hereafter "Zhang and Dai")

Zhang and Dai discloses, among other things, a number of joint transmission schemes for BSC, including so-called joint transmission Minimum Mean Square Error (MMSE), so-called joint transmission Zero Forcing (ZF) and so-called joint transmission Null Space Decomposition (NSD). Zhang and Dai also discusses non-BSC transmission schemes, which may be referred to for convenience as "conventional" transmission schemes.

SUMMARY

Whilst it has been shown that BSC (and in particular the MMSE, ZF and NSD schemes mentioned above) could potentially provide significant improvements in OCI suppression compared with conventional transmission schemes, previous investigation and work related to BSC has failed to recognise that any practical/reasonably sized network will not be able to operate as a single BSC group. In other words, a single large group of base stations with coordination between all of those base stations will not be possible. This is because cooperation between a large number of base stations would incur heavy signalling overhead, which would in turn result in increased latency and potential overload of the network's backhaul structure. For this reason, any practical network implementing BSC will necessarily require multiple BSC groups operating in parallel. That is, multiple smaller groups of BSs in which coordination exists only between BSs within a group, but the respective different groups operate in parallel (i.e. without coordination between the parallel operating groups).

Because previous work related to BSC has failed to recognise the need for multiple BSC groups operating in parallel, a resulting difficulty has also been overlooked, namely that the parallel operation of the different groups will inevitably result in interference between those respective groups. In other words, different BSC groups operating in parallel will interfere with each other. Such inter-group interference may also be referred to as "out of group interference" or OGI. Thus, the terms "inter-group interference" and "OGI" may be considered synonymous. OGI will severely degrade system performance thereby significantly reducing any performance gains achievable through the use of BSC. To avoid confusion, OGI is interference which affects transmissions from BSs in a particular BSC group to UEs served by that group, and such interference arises as a result of transmissions between BSs of one or more other BSC groups and the UEs served by said other group(s).

The above-mentioned previously-unrecognised problem of inter-group interference or OGI may be in addition to, and may exacerbate problems caused by, interference between BSs or between UEs within a BSC group. Such interference between BSs or UEs within a BSC group may be referred to as "self-group interference".

The present invention has been conceived in recognition of the above problems.

In view of the above, one aspect of the invention (or at least an embodiment of one aspect) may be considered to reside broadly in a method for use in a multiple-input multiple-output wireless communication system in which:

a plurality of base stations are provided each of which can transmit signals to, and receive signals transmitted from, one or more user equipments;

the base stations are organised into a plurality of groups;

in a given group of base stations serving one or more user equipments, those serving base stations coordinate with each other to simultaneously transmit signals to the one or more served user equipments, and one or more of the served user equipments feed back information to one or more of those serving base stations, wherein said information incorporates inter-group noise information related to interference between different base station groups, and wherein the method involves processing signals for simultaneous transmission from base stations of a group to one or more user equipments served by that group, said processing using the inter-group noise information fed back to the base station(s) of that group to improve system performance. The improvement in system performance could be, for example, an improvement in the transmission capacity, an improvement in the control of the signal-to-interference-plus-noise ratio (SINR) etc.

Another aspect of the invention (or at least an embodiment of another aspect) may be considered to reside broadly in a multiple-input multiple-output wireless communication system comprising:

a plurality of base stations, each of which can transmit signals to, and receive signals transmitted from, one or more user equipments, wherein the base stations are organised into a plurality of groups; and in a given group of base stations serving one or more user equipments, those serving base stations coordinate with each other to simultaneously transmit signals to the one or more served user equipments, and one or more of the served user equipments feed back information to one or more of those serving base stations, said information incorporating inter-group noise information related to interference between different base station groups;

wherein signals are processed for simultaneous transmission from base stations of a group to one or more user equipments served by that group and said processing uses the inter-group noise information fed back to the base station(s) of that group to improve system performance. As above, the improvement in system performance could be, for example, an improvement in the transmission capacity, an improvement in the control of the signal-to-interference-plus-noise ratio (SINR) etc.

A further aspect of the invention (or at least an embodiment of a further aspect) may be considered to reside broadly in an apparatus for use in a multiple-input multiple-output wireless communication system, the system comprising:

a plurality of base stations, each of which can transmit signals to, and receive signals transmitted from, one or more user equipments, wherein the base stations are organised into a plurality of groups; and in a given group of base stations serving one or more user equipments, those serving base stations coordinate with each other to simultaneously transmit signals to the one or more served user equipments, and one or more of the served user equipments feed back information to one or more of those serving base stations, said information incorporating inter-group noise information related to interference between different base station groups; wherein the apparatus processes signals for simultaneous transmission from base stations of a group to one or more user equipments served by that group and, said processing uses the inter-group noise information fed back to the base station(s) of that group to improve system performance. Again, the improvement in system performance could be, for example, an improvement in the transmission capacity, an improvement in the control of the signal-to-interference-plus-noise ratio (SINR) etc.

In the apparatus aspect of the invention, the apparatus could take a wide range of possible forms. For example, the apparatus could be, or might be part of, a base station in a group, said base station cooperating with other base stations in that group. Alternatively, the apparatus may be formed from separate components which form part of, or reside concurrently in, different base stations of the group but nevertheless operate as described above. As a further alternative, the apparatus could be something (e.g. another element in the wireless communication system) which is separate from the base stations but which nevertheless functions to process signals for simultaneous transmission from the base stations of the group to one or more user equipments served by the group.

In general, and unless there is a clear intention to the contrary, features described with respect to one aspect (or embodiment) of the invention may be applied equally and in any combination to any other aspect, even if such a combination is not explicitly mentioned or described herein.

As is evident from the foregoing, the present invention involves signal transmissions between base stations and user equipments in a multiple-input multiple-output (MIMO) wireless communication system. Such transmissions will generally comprise wireless radio frequency signal transmissions suitable for telecommunication, although no strict limitation is meant thereby and the invention could also be used for wireless communications on other frequencies in the electromagnetic spectrum.

A base station (BS) may take any form suitable for transmitting and receiving such signals. It is envisaged that base stations will typically take the form proposed for implementation in, for example, the 3GPP LTE, 3GPP LTE-A, IEEE 802.16 and 802.11 groups of standards, and a base station may therefore also be described as a NodeB or an eNodeB (eNB) as appropriate to those documents. However it is to be clearly understood that no particular limitation is to be implied from this. Indeed, subject to the functional requirements of the invention, some or all base stations may take any other form suitable for transmitting signals to, and receiving signals from, user equipments (subject only to the requirements of the invention).

Similarly, a user equipment may take any form suitable for transmitting signals to, and receiving signals from, one or more base stations (again, subject only to the requirements of the invention). To avoid confusion, a user equipment (UE) may also be described as a subscriber station (SS), or a mobile station (MS), and strictly speaking, it may take any suitable fixed-position or movable form. For the purpose of understanding the invention, it may be convenient to imagine user equipments (UEs) as mobile handsets (and in most instances, at least some—if not all—of the UEs will comprise mobile handsets). However no limitation whatsoever is to be implied from this and user equipments could also take a wide range of other forms. It is expected that user equipments may take a form compatible with, for example, the 3GPP LTE, 3GPP LTE-A, IEEE 802.16 and 802.11 groups of standards.

The geographical arrangement of base stations with respect to each other may define the layout of cells (and sectors of the cells) in the wireless communication system (i.e. in the network). The invention is not necessarily limited to any particular geometric/geographical base station arrangement or cell layout. Embodiments of the invention are described below with reference to a configuration in which the arrangement of base stations defines hexagonal cells, or strictly speaking, hexagonal cells having three cell sectors per cell. However, a range of other configurations may be possible.

In the present invention, base stations are organised into groups. In each group, the base stations of that group cooperate (i.e. they perform Base Station Cooperation (BSC)—hence a group may be referred to as a BSC group) so that data to a given UE served by the BSC group is simultaneously transmitted from multiple of the said base stations of the BSC group in a manner adapted to improve the received signal quality at the UE, and in particular, to cancel or reduce other cell interference (OCI).

In the explanation of the invention given herein, a UE which is "served" by a particular BSC group will generally be a UE which is geographically located within range of (at least one but generally a plurality of) the base stations of that BSC group. A "served" UE can therefore communicate (i.e. receive signals from and transmit signals to) one or more base stations of the group, and can thus, by corollary, communicate with the BSC group as a whole.

It has been explained that, where BSC is used, data to a UE which is served by a BSC group is simultaneously transmitted from multiple of the base stations in that BSC group. In this context, and in this specification, "simultaneous" should not be understood as meaning that transmissions to the UE from the different base stations in the group must necessarily be at exactly the same time, or that they must necessarily overlap in time, or that they must necessarily begin or end at exactly the same instant, or anything such (although, as discussed below, transmissions should preferably be aligned in time and frequency). Rather, what is meant by "simultaneous" is that, in transmitting the data to that served UE, those different base stations in the group must all transmit within the same time slot.

In the operation of BSC, each UE served by a given BSC group feeds back information to one or more of the serving base stations of that BSC group. The fed back information may be referred to as channel state information (CSI) and includes inter-group (OGI) noise information related to interference between different BSC groups. The fed back CSI may also include intra-group (self-group interference) noise information related to interference within the BSC group associated with transmissions between UEs and the different individual serving base stations of that group. The fed back CSI may further include, for example, measurements of channel state/statistical information such as the Signal to Interference plus Noise Ratio (SINR) and measurements relating to channel spatial structure and other channel-related parameters. The inter-group noise information fed back as part of the CSI may include information on frequency variations of the noise level, for example:

noise levels for a frequency band divided into more than one part;

noise levels for one or more carrier frequency;

noise level for the part(s) of the spectrum used for the most recent transmission of data to the user equipment;

noise levels for one or more selected parts of the frequency band. The selection could be by the BSC group/network or by the UE (e.g. the sub-band with the lowest noise level).

Feedback of channel state information (CSI) by a served UE enables processing of signals for simultaneous transmission, by serving BSs in the BSC group, to one or more of the served UEs, and in particular, it enables inter-group (OGI) noise to be used to improve system performance. In preferred embodiments, said processing may involve precoding or precoder design in which the inter-group noise is taken into consideration. The feedback of CSI may also enable such things as link adaptation, scheduling and the like. This is discussed further below.

As mentioned above, one of the parameters related to system performance which may be improved by the present invention is system throughput or transmission capacity. That is, the total amount/volume of data that can be transmitted within the system in a given time. This may also be viewed as an improvement in spectral efficiency, as more data may be transmitted in a given time using a given allocation of frequency resources.

BRIEF DESCRIPTION OF THE FIGURES

The accompanying figures help to explain certain features and aspects of the invention as well its operation and benefits. However, it is to be clearly understood that the figures are given for the purposes of explanation and to assist understanding only, and the invention is not necessarily limited in any way to or by any of the figures. In the figures:

FIG. 1(a) schematically illustrates an example system architecture of a BSC group.

FIG. 1(b) schematically illustrates the functions of the virtual BS in FIG. 1(a).

DETAILED DESCRIPTION

Figure 2:
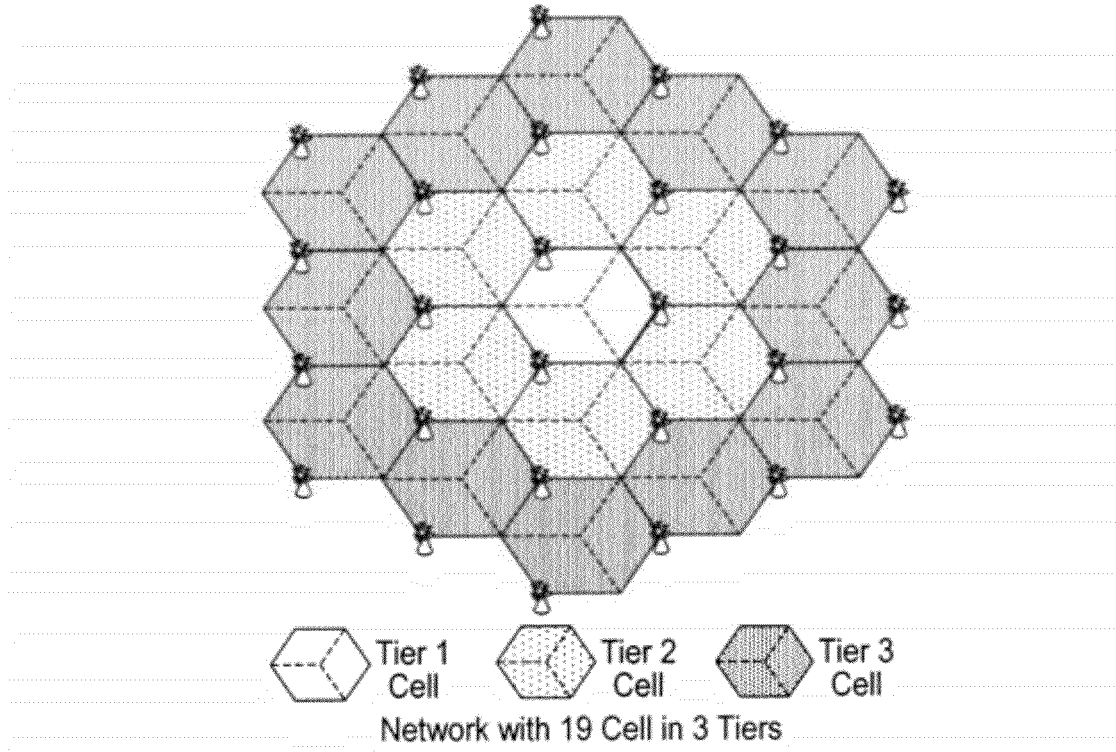
FIG. 2 schematically illustrates the network of hexagonal cells which was modelled for the purpose of performing simulations.

The aspects and features of the invention are described below with reference to a mathematical model of a BSC group (i.e. a mathematical model of a cooperating group of base stations (BSs)). The mathematical model described below has also been used to perform a number of simulations, the results of which are also discussed below.

For the purpose of defining the mathematical model, let $N_B$ represent the number of BSs in the BSC group, and let $N_U$ represent the number of UEs served by those cooperating BSs in each time slot. Also, let $N_R$ be the number of antennas on each UE, and let $N_T$ be the number of transmitter antennas on each BS in the BSC group. In situations where a single BS is a member of multiple BSC groups, $N_T$ should be understood as the number of antennas of that BS that are used within one BSC group (this issue is discussed further below).

For simplicity of mathematical expression, it is useful to represent the $N_B$ separate cooperative BSs in a given BSC group as a single equivalent virtual BS with $N_T N_B$ antennas. The multiple data signals transmitted by the $N_B$ separate cooperative BSs may therefore also be represented as a single equivalent signal transmitted by the virtual BS. This single equivalent signal may be represented as a vector $s \in C^{N_R N_u \times 1}$ (Note: here and elsewhere C represents a complex vector/matrix with the dimensions specified). Similarly, a vector $y \in C^{N_R N_u \times 1}$ may be used as a single equivalent vector representing the signals received by the $N_R N_U$ antennas of the $N_U$ UEs, (although it should be noted that the UEs are not assumed to have the ability to cooperate with each other or to directly exchange any information).

As explained above, the MIMO channel from the $N_T N_B$ transmitter antennas of the BSs in the BSC group to the $N_R N_U$ receiver antennas of the served UEs (i.e. the channel from the virtual BS to the UEs served in a given time slot) may be represented as a matrix $H \in C^{N_R N_U \times N_T N_b}$. It is assumed that H is always full rank and represents flat fading channels. In systems such as 3GPP Long Term Evolution (LTE) that use OFDM, this model describes one frequency domain carrier. The matrix $H=[H_1^T, \ldots, H_{N_U}^T]^T$, where $H_k$ ($k \in [1, \ldots, N_U]$) represents the channel from the $N_T N_B$ transmitter antennas of the virtual BS to the $N_R$ antennas of UE k.

A matrix $T \in C^{N_T N_B \times N_R N_U}$ is a precoding matrix for processing the signal vector s according to the channel knowledge at the virtual BS (this channel knowledge is obtained from the information fed back by the UEs). The vector $n \in C^{N_R N_U \times 1}$ represents noise affecting the signal y received by the UEs. The noise represented by a vector n may be due to, for example, transistor noise, shot noise, black body radiation of the Earth, etc. For the purposes of the mathematical model, it is assumed that the noise represented by vector n is additive white Gaussian noise (AWGN) with zero mean. The covariance of the noise is denoted $N_0$.

Thus, the cooperating BSC group may be modelled by the following mathematical expression:

$$y = HTs + n. \quad (1)$$

The precoding matrix T may be given by:

$$T = F(\text{diag}(p)^{(1/2)}). \quad (2)$$

where, for a vector v, diag(v) returns a diagonal matrix with the entries of v along the main diagonal, and also where, for a diagonal matrix B, $B^{1/2}$ is defined as a diagonal matrix with diagonal elements equal to the square root of the diagonal elements of B.

The matrix $F \in \mathbb{C}^{N_T N_B \times N_R N_u}$ is an equivalent precoding matrix defined without a power constraint and may be written as $F=[F_1, \ldots, F_{N_U}]$, where $F_k (k \in [1, \ldots, N_U])$ denotes the precoding matrix for the $k^{th}$ UE (defined without power constraints) which spreads the $N_U$ data streams for UE k onto the $N_T N_B$ antennas of the virtual BS.

The vector p is a transmission power vector. The $k^{th}$ element of p, denoted $p_k$, is the allocated power for the $k^{th}$ antenna of the virtual BS. The method used for the calculation of p is not narrowly critical to the present invention and therefore will not be discussed in detail. However, as an example, a power allocation strategy based on per-base power constraints is introduced in Zhang and Dai.

From equation (2) above, equation (1) can be written as:

$$y = HF(\text{diag}(p)^{(1/2)})s + n \qquad (1')$$

and by denoting $H_{eq} = HF$ this becomes $$y = H_{eq}(\text{diag}(p)^{(1/2)})s + n. \qquad (1'')$$

Next, in order to simplify the mathematical model, and to allow simulations to be more easily performed based on said model, it is useful to make certain assumptions. These assumptions are things which may also be considered preferable in any practical implementation of the invention.

The coding process for interference cancellation should be performed, at least mostly, at the cooperating BSs (which are represented in the model by the virtual BS). This may help to reduce the calculation burden and power consumption at UEs and also utilise the greater processing capability of the BSs.

Explicit channel state information (CSI) should preferably be available in each of the groups of cooperating BSs (i.e. in each of the BSC groups). The "ideal" condition where complete, perfect, explicit CSI is available for all BSs in a group may perhaps be approachable or approximated in practice, but can technically never be fully achieved. Therefore, the situation where complete, perfect, explicit CSI is available should be considered to represent a performance upper bound on the more realistic case of somewhat imperfect CSI availability.

Data should preferably be spread over multiple transmission points in the BSC group, and sufficient backhaul bandwidth should preferably be available for complete data and CSI exchange between BSC groups.

Data Transmission from multiple BSs should be aligned in both time and frequency. In practice, techniques (which will be known to those skilled in the art) such as the use of the Cyclic Prefixing (CP) and frequent carrier frequency calibration at BSs may help to achieve the required alignment.

FIG. 1(a) schematically illustrates an example system architecture of a BSC group. As shown, all BSs 2 in the group are connected to a function module called the BSC controller 1. Data links having high bandwidth and low delay are used to connect each BS 2 to the BSC controller 1, and also to connect the BSs 2. The module 4, which incorporates the BSs 2 and the BSC controller 1, may be regarded as one virtual BS 4.

The virtual BS 4 is connected to the UEs 3 through wireless channels and it receives channel information fed back from the UEs 3 in an analogous manner to a single BS in a multiuser MIMO (MU-MIMO) system. However, the virtual BS 4 differs from a single BS because the virtual BS 4 has individual power constraints on transmissions from each of its individual BSs 2, and there may be certain bandwidth and delay limits on the interlinks between its BSs 2 and also between a BS and the BSC controller 1.

FIG. 1(b) schematically illustrates the functions of module 4 (i.e. the functions of the virtual BS 4), which include transmitting a pilot signal, receiving channel state information (CSI) fed back from UEs, a scheduling process, precoding and data transmission.

The pilot transmissions may be BS specific so that channels to different BSs may be measured. The channel feedback process may however be more flexible in that, as part of the BS cooperation, one BS may decode the feedback intended for other BSs and pass it through the high speed data links. Based on the CSI received, the scheduler will choose the UE to serve and the precoder will calculate the precoding matrices, as described further below.

FIG. 2 schematically illustrates the network which was modelled for the purpose of performing simulations based on the mathematical model described above. The network has 19 hexagonal cells. The cells are divided into three tiers, and the different tiers are distinguishable by different shading in FIG. 2. The central cell in FIG. 2 is the only Tier 1 cell and is shown un-shaded (i.e. it is shown in white). The cells immediately surrounding the Tier 1 cell are Tier 2 cells and are shown in light grey shading. The remaining cells which surround the Tier 2 cells are Tier 3 cells and are shown in darker grey shading.

All cells in the network of FIG. 2 are corner-excited. More specifically, each hexagonal cell has a BS located at every second corner thereof. This means there are three BSs to cover the cell from every other corner thereof. In this model, each cell may be considered as a cooperative area in that any UE within a given cell will be jointly served by the three BSs of that cell. Consequently, for a given cell, the three BSs serving that cell constitute a BSC group. However, it should be noted that the present invention does not necessarily require BSC groups to correspond precisely with individual cells. In fact, the BSC groups need not necessarily reflect in any way the delineation between the cells of the network (although in many cases, such as in FIG. 2, they will).

At this point it should be noted that the question of which base stations belong to which BSC groups may depend on the structure and configuration of the particular BSs used. For instance, in some cases, the structure/configuration/equipment of the BSs may be such that a base station comprises a single base station with separate antennas directed into each cell served by that base station. In such a case, a given BS might serve more than one cell, and as a consequence, that BS might also form part of more than one BSC group. On the other hand, in other instances, at a given geographical BS site, the structure/configuration/equipment at the site may be such that there is in fact a separate BS (or at least a notionally separate BS) for each cell served from that site, with each such separate or notionally separate BS having antennas directed only into the cell which it serves. In this case, each separate or notionally separate BS may serve only one cell, and may be part of only one BSC group.

To illustrate this using the example cell configuration and BSC group configuration in FIG. 2, recall that each BS in FIG. 2 is located at the intersecting corner between three cells and has an antenna (or a set of antennas) directed into each cell adjoining at that intersection. Accordingly, if each BS in FIG. 2 were to be of the former kind described above (a single base station with separate antennas for each adjoining cell), then each BS would be a part of three BSC groups. On the other hand, if each BS in FIG. 2 were to be of the latter kind described above comprising three separate or notionally separate BSs at each site, then for each BS illustrated in FIG. 2 there would be three "notional BSs", and the respective notional BSs would each form part of one BSC group only.

For the avoidance of doubt, the present invention may operate irrespective of which of the above-mentioned base station configurations is used. However, the present invention has been conceived in recognition of the need for multiple BSC groups operating in parallel. The reasons for this are explained above. Therefore, irrespective of which of the above-mentioned configurations applies, the present invention is concerned with the situation where the BSC groups operate "in parallel" and without coordination between BSC groups.

As previously explained, the mathematical model described above has been used to perform a number of simulations. Simulations were, in fact, performed based on up to 60 UEs per BSC group (i.e. up to 60 UEs located in the geographical region served by the group, but not all UEs are necessarily served in each time slot), and with each group operating independently and without regard to any other group. The focus of the simulations was on performance analysis and precoder design in the Tier 1 cell. The other two tiers of BSC groups (Tier 2 and Tier 3) were treated only as a source of interference for the Tier 1 BSC group. All signals were transmitted on the same frequency band. Other parameters used for performing simulations are set out in Table 1 below.

| Parameter | Value or Setting |
| --- | --- |
| Layout | Tri-sectored corner-excited grid with 19 cells in three tiers |
| No. of antennas on BS | 2 per cell |
| No. of antennas on UE | 2 |
| Inter-BS-site distance | 1000 m |
| Small scale fading | Rayleigh |
| Path loss and shadowing | WINNER Phase II_* |
| Antenna pattern | $A(\theta) = -\min\left[12\left(\frac{\theta}{\theta_{3dB}}\right)^2, A_m\right]$ $\theta_{3\,dB} = 70°, A_m = 20$ dB |
| Frequency | 2 GHz |
| Bandwidth | 20 MHz |
| Noise floor | −105 dBm |
| BS Tx (transmitter) power | 0~30 dBm |
| Tx (transmitter) antenna gain | 15 dBi |
| Tx (transmitter) diversity gain | 3 dBi |
| Rx (receiver) antenna gain | 2 dBi |
| Rx (receiver) diversity gain | 3 dBi |
| Frequency reuse factor | 1 |

*In relation to the WINNER phase II model, see IST-WINNER D1.1.2. Kyösti, et al., "WINNER II Channel Models", ver 1.1, Sept. 2007.

As mentioned above, Zhang and Dai discloses a number of joint transmission schemes for BSC, including Minimum Mean Square Error (MMSE), Zero Forcing (ZF) and Null Space Decomposition (NSD). Whilst Zhang and Dai demonstrates that these schemes have the potential to provide substantial capacity advantages over the conventional transmission scheme, simulations have now been performed using the mathematical model described above with the UEs exposed to the previously-overlooked effects of interference between BSC groups (i.e. inter-group interference or OGI). In the simulations, the UEs were served on a round-robin (RR) basis as described in Zhang and Dai. In summary, these simulations indicate that the benefits (discussed in Zhang and Dai) achieved using MMSE, ZF and NSD are markedly reduced by the effects of OGI. This will be discussed further below.

Figure 3:
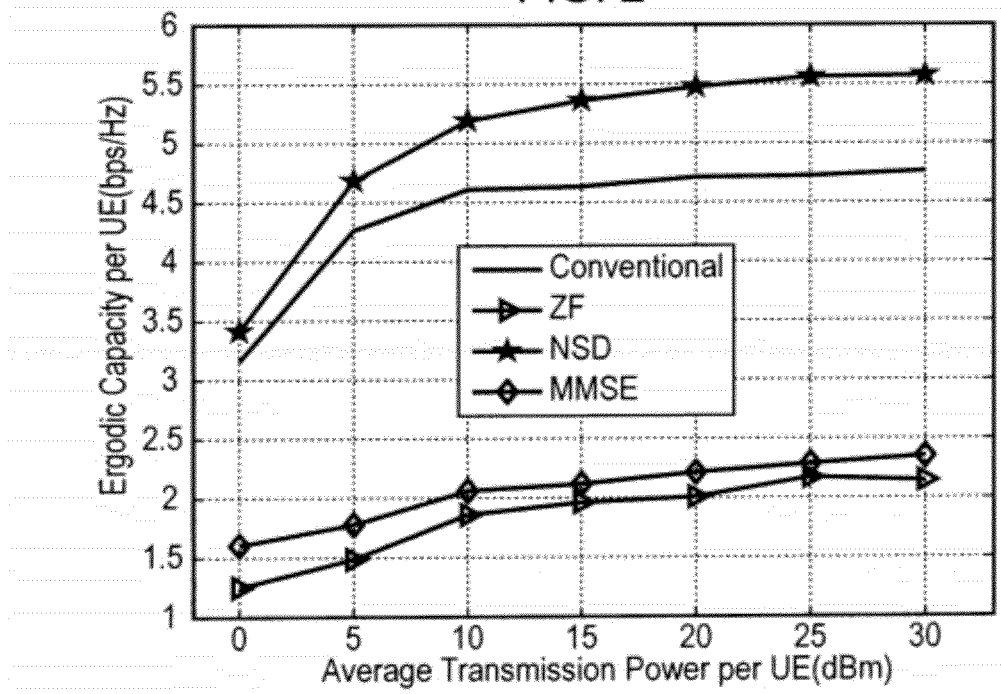
FIG. 3 is a plot of the results of simulations which were performed to assess the performance of the MMSE, ZF, NSD and conventional schemes in Zhang and Dai when the effect of inter-group interference (OGI) is taken into consideration.

FIG. 3 illustrates the results of the simulations which were performed to assess the performance of the MMSE, ZF, NSD and conventional schemes in Zhang and Dai when the effect of inter-group interference (OGI) is taken into consideration. In FIG. 3, the curves plot, for the Tier 1 cell, the average capacity per UE (which may also be described as the average rate per UE and is given in units of bps/Hz) against the BS transmit power per UE (given in units of dBm). These results will be revisited further below for the purposes of comparison, and it will be demonstrated that, whilst the performance of the above-mentioned schemes from Zhang and Dai is impaired by the effect of inter-group interference, on the other hand, performance can be markedly improved using the present invention.

As explained above, the present invention aims to solve the problem that parallel operation of multiple independent BSC groups will inevitably result in interference between those groups. In terms of the mathematical model described above, one way in which this problem may be addressed is by designing the precoding matrix F (equivalent to designing the precoding matrix T for a given p—see equation (2) above) so that, in the operation of the system overall (as modelled for example by equation (1) above), the effects of inter-group interference are reduced.

In one particular embodiment (which will be referred to herein as the OGI-aware embodiment), the precoding matrix F is defined (and hence obtained in practice) using the following equation:

$$F = H^H(HH^H + \mu I)^{-1} \quad (3)$$

where, for example, $H^H$ indicates the "conjugate transpose" or "Hermitian transpose" obtained from H by taking the transpose thereof and then taking the complex conjugate of each entry.

Equation (3) above used for computing the precoding matrix F in the OGI-aware embodiment is similar to the MMSE equation in Zhang and Dai. However, importantly, equation (3) above differs from the MMSE equation in Zhang and Dai in that, whereas the equation in Zhang and Dai assumes that the only noise associated with a system is white Gaussian noise, equation (3) above introduces the new scalar quantity $\mu$ which also takes into account noise associated with interference between BSC groups, as described further below.

In equation (3) above, the matrix I may be (and generally will be) the identity matrix (hence the use of the commonly accepted notation for the identity matrix in equation (3) above). However, it should also be recognised that, as an alternative to the identity matrix, a diagonal matrix or a general Hermitian matrix according to the covariance of the receiver noise and interference could also be used. In the case of a diagonal matrix, a diagonal matrix with different weights on its main diagonal to reflex different interference levels on the different receiving antennas could also be used, and this may provide further performance advantages.

For mathematical modelling purposes, inter-group interference or OGI may be treated as additional noise in the system. That is, noise which is in addition to the zero-mean white Gaussian background noise represented by vector n in equation (1) above. Because the inter-group interference is treated as additional noise, the total noise in the system can no longer be considered "white". Rather, total noise affecting the UEs will be "coloured" noise because the white background noise represented by vector n is "coloured" by the additional inter-group interference noise.

To account for this coloured noise, one or more noise whitening filters (NWFs) should be used. Preferably, a NWF will be installed in each UE. This way, the information fed back by the UEs (including any information or component thereof associated with noise) may be post-NWF information (i.e. "whitened" information obtained after processing by the NWF). However, it should be stressed that the invention is not necessarily limited to the noise whitening being performed at the UEs, and noise whitening could potentially be performed at base stations or elsewhere in the network. Nevertheless, for the purpose of explaining the present OGI-aware embodiment, it will be assumed that a NWF is installed in each UE.

Let $W_k$ be the covariance matrix of the total "coloured" noise (i.e. the Gaussian white noise plus the inter-group interference noise) affecting UE k. A receiver filter of the form $$W_k^{-\frac{1}{2}}$$

may be used to whiten the coloured noise affecting UE k. Hence, $$W^{-\frac{1}{2}} = \text{diag}\left(W_1^{-\frac{1}{2}}, \ldots, W_{N_U}^{-\frac{1}{2}}\right).$$

Following from this, the signal model given by equation (1), after noise whitening, may be expressed as:

$$W^{-\frac{1}{2}} y = W^{-\frac{1}{2}} HTs + W^{-\frac{1}{2}} n. \qquad (4)$$

By denoting the equivalent channel after whitening $$H_W = W^{-\frac{1}{2}} HT,$$

equation (4) above may be rewritten:

$$W^{-\frac{1}{2}} y = H_W s + W^{-\frac{1}{2}} n. \qquad (4')$$

The power of the white Gaussian background noise component of the total noise, after it has been whitened through NWF processing, may be denoted $\tilde{N}_0$. Similarly, the power of the inter-group interference (OGI) component of the total noise, after it has been whitened through NWF processing, may be denoted $\tilde{I}_0$. Thus, after whitening, the power of the whitened total noise is $(\tilde{I}_0 + \tilde{N}_0)$. The information fed back from a UE to the virtual BS should include the equivalent whitened channel $H_W$ and also the whitened total noise power (i.e. the value of $(\tilde{I}_0 + \tilde{N}_0)$).

Recall that in the OGI-aware embodiment the precoding matrix F is computed using equation (3), i.e. $F=H^H(HH^H+\mu I)^{-1}$, where the quantity $\mu$ takes into account noise associated with interference between BSC groups. More specifically now, this may be achieved by defining $\mu$ as follows:

$$\mu = \frac{\tilde{I}_0 + \tilde{N}_0}{\bar{p}_k} \beta \qquad (5)$$

where the scalar $\bar{p}_k$ is the mean value of the elements in the power vector p, and $\beta$ is a parameter that can be varied, as discussed further below, in order to find the value of $\mu$ which in turn gives the precoding matrix F that ultimately yields the greatest improvement in system performance.

At this point, it should be noted that other possible definitions of $\mu$ (i.e. other than the one given in equation (5) above) are possible. Any such definition should take into consideration noise associated with inter-group interference (OGI). However, ultimately, other embodiments could operate with such alternative definitions of $\mu$, and hence such other embodiments fall within the scope of the invention.

In any event, in order for the precoding matrix F to be one that yields a large improvement in system performance, it is necessary, each time F is defined, to find an appropriate value of $\mu$ that achieves this.

At this point, two possible variants of the OGI-aware embodiment should be mentioned. In the first variant, which may be referred to as "adaptive-$\mu$", the value of $\mu$ (according to which the precoding matrix F yields a large improvement in system performance) is re-computed for each channel realisation. On the other hand, in the second variant which may be referred to as "universal-$\mu$", the value of $\mu$ (and hence the precoding matrix F) are not found for each specific channel realisation. Rather, in universal-$\mu$, a mean value of $\mu$ is used. More specifically, in universal-$\mu$, the first few channel realisations may be utilised as a training sequence and the best value of $\mu$ may be found in each of the channel realisations in the training sequence. Then the average (mean) of those $\mu$ values may be taken and used as the $\mu$ value (i.e. used to calculate the precoding matrix F) for subsequent channel realisations. In universal-$\mu$, training sequences may be repeated from time to time (or periodically) to renew the average $\mu$ value used, but the value of $\mu$ used is still not calculated for each channel realisation as it is in adaptive-$\mu$. Those skilled in this area will recognise that adaptive-$\mu$ may involve a more complicated implementation than universal-$\mu$, but may also achieve larger performance gains. On the other hand, with universal-$\mu$, benefits of the invention may be achieved with a significantly reduced computational burden.

In any case, in both the adaptive-$\mu$ and the universal-$\mu$ variants, the value of $\mu$ according to which the precoding matrix F yields a large improvement in system performance must be found each time each time a new precoding matrix F is computed. The method for selecting the appropriate value of $\mu$ is not narrowly critical and all appropriate methods are considered to fall within the scope of the present invention. That is to say, for a given definition of $\mu$ (i.e. whether $\mu$ is defined by equation (5) above or has some other definition), any method by which the best value of $\mu$ is determined to achieve improved performance is considered to fall within the scope of the present invention.

In many instances, the problem of finding an appropriate value of $\mu$ may not be convex (in a mathematical sense). Therefore, in the OGI-aware embodiment (where $\mu$ is defined according to equation (5)), rather than attempting to find or "solve for" $\mu$ based on a local optimisation of the transmission capacity, the approach taken is to instead:

(i) select a number of candidate values of $\beta$,
(ii) for each selected candidate $\beta$ value, calculate a trial value for $\mu$ and hence calculate a corresponding trial precoding matrix F,
(iii) for each trial $\mu$ and trial F obtained in this way, calculate the transmission capacity (or rate); and
(iv) select, as the value for $\mu$, the trial $\mu$ value that delivered the greatest calculated transmission capacity (or rate) of the ones trialled.

The algorithm given by steps (i) to (iv) above is repeated each time a new precoding matrix F is to be computed.

Regarding step (iii) above, those skilled in the art will recognise that because H, $\tilde{N}_0$ and $\tilde{I}_0$ are known (or can be determined) from UE feedback and the power vector p (and hence $\bar{p}_k$) is also known, therefore, for a given candidate β value, a trial μ value can be obtained from equation (5). This trial μ value can in turn be used to calculate a trial F using equation (3). Next, based on this trial F (and given that p is known) it is possible to calculate the matrix T (or $T_k$ for a UE k) using equation (2), and from this it is possible to calculate the transmission capacity (or equivalently the rate) for UE k. The calculation of the transmission capacity (rate) for UE k, denoted $R_k$, may be performed, for example, using an equation of the form:

$$R_k = \log\left|I + \left[N_0 I + H_k\left(\sum_{i \neq k} T_i T_i^H\right) H_k^H\right]^{-1} H_k T_k T_k^H H_k^H\right|. \quad (5')$$

Equation (5') above is similar in certain respects to equation number 16 presented in Zhang and Dai. For instance, both are used to calculate the transmission capacity (rate) for a given UE. Also, in equation (5') above, the quantity $H_k T_k T_k^H H_k^H$ represents the covariance of the received useful signal, and likewise, the quantity which occupies the equivalent position in equation 16 of Zhang and Dai also represents much the same thing.

However, it is important to recognise that the two equations are not the same (i.e. equation (5') above and equation number 16 in Zhang and Dai are not merely equivalent). This is because, in equation (5') above, the quantity $$H_k\left(\sum_{i \neq k} T_i T_i^H\right) H_k^H$$

indicates the covariance of all of the interference (i.e. including the intra-group interference and the inter-group interference) and the whole of the interference can be measured at the corresponding UE. In contrast to this, the quantity which occupies the equivalent position in equation 16 of Zhang and Dai represents the intra-group interference only.

An equation of the general form of equation (5') above was used in simulating the performance of the MMSE, ZF, NSD and conventional schemes in Zhang and Dai, but importantly, with the effect of inter-group interference is taken into consideration. As discussed above, the results of these simulations are shown in FIG. 3.

In any event, if an algorithm similar to that given by (i)-(iv) above is used, the method by which the rate is calculated in (iii) is not necessarily critical.

Figure 4:
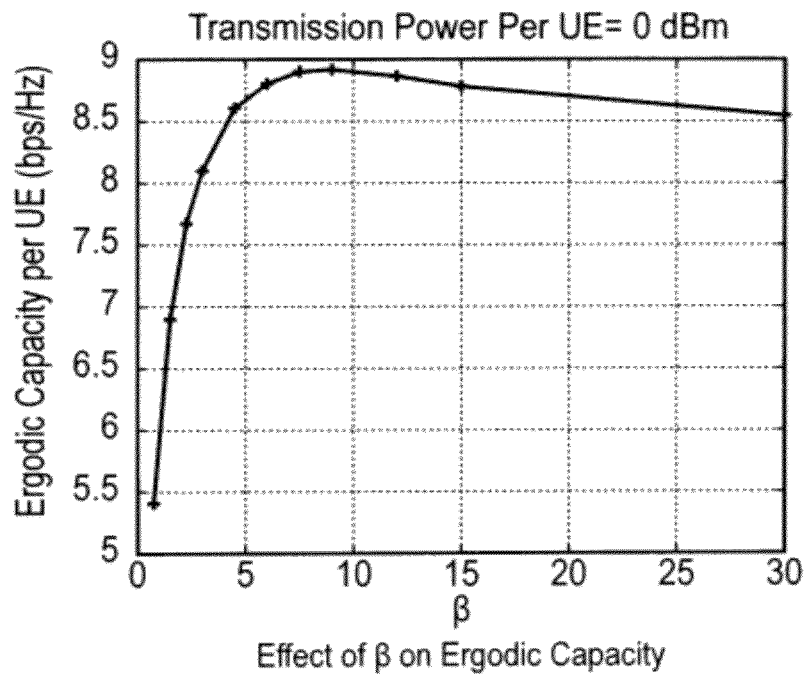
FIG. 4 contains an example plot for illustrating the operation of the invention.

By way of further illustration of how the OGI-aware embodiment generally operates, FIG. 4 contains an example plot of transmission capacity per UE as parameter β changes. In order to generate the plot in FIG. 4, basically, a series of 11 candidate β values were selected in the range from 0 to 30. Using these candidate β values, corresponding trial μ values and corresponding trial precoding matrices F were computed. And for each trial μ value (and the corresponding F) thus computed, the transmission capacity (rate) was then computed. These transmission capacity (i.e. rate) versus β points have been plotted in FIG. 4, and in fact, the respective points are indicated by a "+" on the curve in FIG. 4. From FIG. 4 it can be determined which of the candidate β values (and hence which trial μ value) achieves the greatest transmission capacity (in FIG. 4 it is the one β≈9.5). The trial μ value corresponding to this β value can then be selected as the μ value for computing the actual precoding matrix F for use in transmission.

Figure 5:
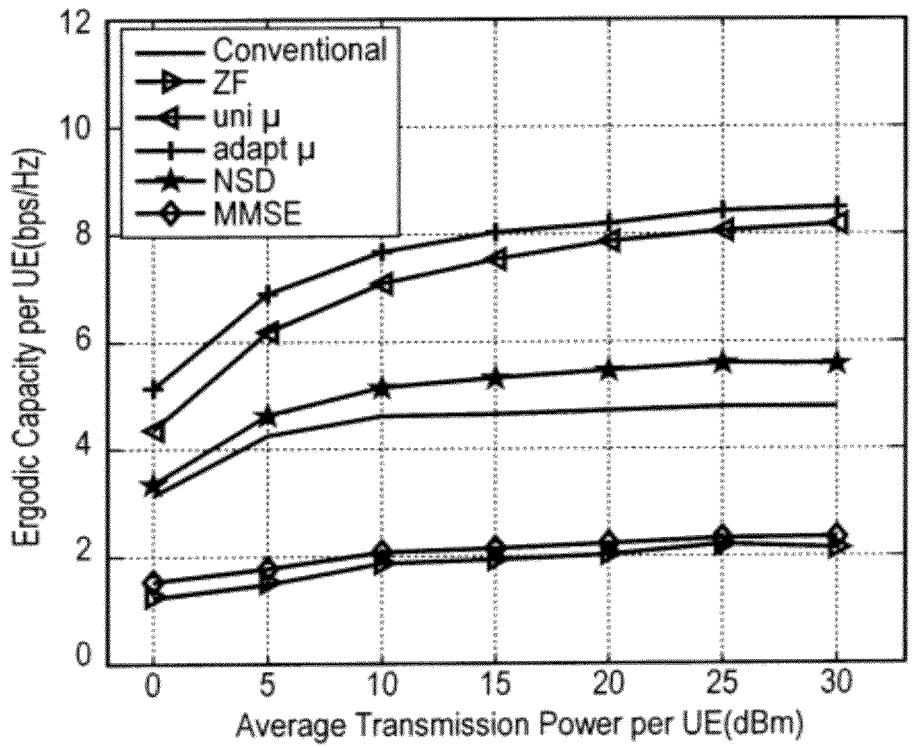
FIG. 5 is a plot comparing the transmission capacity achievable using one particular embodiment of the invention (the OGI-aware embodiment) with the results achievable using the MMSE, ZF, NSD and conventional approaches discussed in Zhang and Dai.

FIG. 5 provides a comparison of the transmission capacity achievable using the OGI-aware embodiment described above with the results achievable using the MMSE, ZF, NSD and conventional approaches discussed in Zhang and Dai. The four lowermost curves plotted in FIG. 5 are, in fact, identical to those shown in FIG. 3 and represent the transmission capacity achieved using the MMSE, ZF, NSD and conventional approaches in Zhang and Dai when inter-group interference is taken into consideration. The two uppermost curves plotted in FIG. 5 represent performance results achieved using the above-mentioned adaptive-μ and universal-μ variants of the OGI-aware embodiment.

To be more specific, FIG. 5 plots, for each of the approaches mentioned in the previous paragraph, the average capacity (or rate) per UE versus average BS transmission power per UE in the Tier 1 cell, and as can be clearly seen, both of the variants of the OGI-aware embodiment (adaptive-μ and universal-μ) provide clear performance advantages. This may be largely attributable to the fact that both variants take inter-group interference (OGI) into account. In fact, universal-μ is shown to achieve bit rate performance approximately 70% higher than the "conventional" method and approximately 50% better than the NSD approach in Zhang and Dai. Furthermore, adaptive-μ is shown to provide a further gain of approximately 0.4 to 0.8 bps/Hz over the universal-μ, which is a total average gain of approximately 80% over the conventional transmission scheme in Zhang and Dai and approximately 60% better than NSD scheme in Zhang and Dai.

Another embodiment of the invention will now be described. This embodiment will be referred to herein as the noise-balancing block-diagonalisation (NB-BD) embodiment. Like the OGI-aware embodiment, the NB-BD embodiment also aims to address the problem of inter-group interference (OGI). However, the NB-BD embodiment also seeks to further address the problem of interference between base stations or between UEs within a BSC group (for example remaining/residual interference not eliminated by OFDM etc), which may be referred to as "self-group interference" or "intra-group interference". As explained above, the problem of intra-group interference may be in addition to the problem of inter-group interference.

The NB-BD embodiment provides a means for block diagonalising the equivalent channel matrix $H_{eq}=HF$ whilst still taking into consideration noise including the noise associated with OGI. In the NB-BD embodiment, the precoding matrix $F_k$ for UE k is given by:

$$F_k = (\tilde{H}_k^H \tilde{H}_k + \mu I)^{-1} H_k^H \quad (6)$$

where $$\tilde{H}_k = [H_1^T, \ldots, H_{k-1}^T, H_{k+1}^T, \ldots, H_{N_U}^T]^T. \quad (6')$$

Note: the matrix $\tilde{H}_k$ therefore does not include the channel matrix $H_k$ of the UE k.

In the NB-BD embodiment, the parameter μ is the same as in the OGI-aware embodiment, and therefore the overall precoding algorithm is also generally the same. That is, it involves:

(i) selecting a number of candidate values of β,
(ii) calculating, for each selected candidate β value, a trial value for μ and hence calculating a corresponding trial precoding matrix F (in the NB-BD embodiment, equation (6) is used to calculate each trial F rather than equation (3) used in the OGI-aware embodiment), (iii) calculating, for each trial µ and trial F obtained in this way, the transmission capacity (or rate); and
(iv) selecting, as the value for µ, the trial µ value that delivered the greatest calculated transmission capacity of the ones trialled.

As for the OGI-aware embodiment above, in the NB-BD embodiment, the algorithm given by steps (i) to (iv) is performed each time a new precoding matrix F is to be computed.

Therefore, the NB-BD embodiment is able to achieve the benefits of taking inter-group interference into consideration in the same way as the OGI-aware embodiment. However, in addition to this, by block diagonalising the equivalent channel matrix $H_{eq}=HF$, the NB-BD embodiment is also able to eliminate or reduce crosstalk between UEs, thus further improving possible system performance gains. The following derivation shows how the equivalent channel matrix $H_{eq}=HF$ is block diagonalised in the NB-BD embodiment.

To begin, note that the singular value decomposition (SVD) of $\breve{H}_k$ may be given by $$\breve{H}_k = \breve{U}\breve{S}\breve{V}^H \quad (7)$$

where $\breve{U}$ is a unitary matrix, $\breve{S}$ is a diagonal matrix with non-zero entries on the diagonal, and $\breve{V}$ is a unitary matrix. Those skilled in the art will recognise that this is merely a standard form of matrix factorisation.

From equation (7):

$$\breve{H}_k^H \breve{H}_k + \mu I = \breve{V}\breve{S}^H \breve{U}^H \breve{U}\breve{S}\breve{V}^H + \mu I. \quad (8)$$

As $\breve{V}$ and $\breve{U}$ are both unitary matrices, $$\breve{V}\breve{S}^H\breve{U}^H\breve{U}\breve{S}\breve{V}^H + \mu I = \breve{V}\breve{S}^H\breve{S}\breve{V}^H + \breve{V}\mu\breve{V}^H = \breve{V}(\breve{S}^H\breve{S}+\mu I)\breve{V}^H. \quad (9)$$

Therefore, $$\breve{H}_k^H \breve{H}_k + \mu I = \breve{V}(\breve{S}^H\breve{S}+\mu I)\breve{V}^H \quad (10)$$

and $$(\breve{H}_k^H \breve{H}_k + \mu I)^{-1} = \breve{V}(\breve{S}^H\breve{S}+\mu I)^{-1}\breve{V}^H. \quad (11)$$

Assume that, in any given cooperation, the number of transmitter antennas is no smaller than the number of receiver antennas: $N_T N_B \geq N_R N_U$ (recall that $N_U$ is not necessarily the total number of UEs present in the area served by the BSC group, or the number of UEs available to the scheduler, but rather it is the number of those UEs served by the BSC group in a given time slot). Hence, $$\breve{S} = [\Sigma \, 0_{N_R(N_U-1)\times M}]. \quad (12)$$

The matrix $\Sigma$ is a diagonal matrix with diagonal elements set equal to the non-zero singular values of $\breve{H}_k$ and its dimension are equal to rank of $\breve{H}_k$, i.e. $N_R(N_U-1)$. Matrix $0_{m\times n}$ denotes a zero matrix of dimension m×n, and the scalar M is equal to $N_T N_B - N_R(N_U-1)$.

As a result, $$\breve{S}^H \breve{S} = \begin{bmatrix} \Sigma^2 & 0_{N_R(N_U-1)\times M} \\ 0_{M\times N_R(N_U-1)} & 0_{M\times M} \end{bmatrix} \quad (13)$$

and $$(\breve{S}^H \breve{S}+\mu I)^{-1} = \begin{bmatrix} \Sigma^2 + \mu I & 0 \\ 0 & \mu I_{M\times M} \end{bmatrix}^{-1}. \quad (14)$$

Accordingly, if µ is much smaller than any element σ in Σ (i.e. µ<<σ):

$$(\breve{S}^H \breve{S}+\mu I)^{-1} \approx \begin{bmatrix} 0 & 0 \\ 0 & \mu^{-1}I \end{bmatrix}. \quad (15)$$

After precoding for UE k, it can be seen from equations (6), (11) and (15) that the channel $HF_k$ will be $$HF_k = H\breve{V}\begin{bmatrix} 0 & 0 \\ 0 & \mu^{-1}I \end{bmatrix}(H_l\breve{V})^H. \quad (16)$$

Also note that $$H\breve{V} = \begin{bmatrix} H_1 \\ \vdots \\ H_{N_U} \end{bmatrix}[\breve{V}_1 \ \ldots \ \breve{V}_{N_U}]. \quad (17)$$

As the matrix $\breve{H}$ is formed of linearly independent vectors, it has $N_R(N_U-1)$ non-zero singular values. The matrix $\breve{V}_{N_U}$ holds the singular vectors corresponding to the other $N_R$ zero singular values (null space) of $\breve{H}$. So $\breve{H}_i\breve{V}_{N_U}=0_{N_R\times N_T}$ for all i≠k.

In the following analysis all the zero matrices 0 are of dimension $N_R\times N_T$. Thus we have, $$H\breve{V} = \begin{bmatrix} H_1\breve{V}_1 & \ldots & H_1\breve{V}_{N_U-1} & 0 \\ \vdots & \ddots & \vdots & \vdots \\ H_{k-1}\breve{V}_1 & \ldots & H_{k-1}\breve{V}_{N_U-1} & 0 \\ H_k\breve{V}_1 & \ldots & H_k\breve{V}_{N_U-1} & H_k\breve{V}_{N_U} \\ H_{k+1}\breve{V}_1 & \ldots & H_{k+1}\breve{V}_{N_U-1} & 0 \\ \vdots & \ddots & \vdots & \vdots \\ H_{N_U}\breve{V}_1 & \ldots & H_{N_U}\breve{V}_{N_U-1} & 0 \end{bmatrix} \quad (18)$$

and $$H_k\breve{V} = [H_k\breve{V}_1 \ \ldots \ H_k\breve{V}_{N_U-1} \ H_k\breve{V}_{N_U}]. \quad (19)$$

Therefore $$H\breve{V}\begin{bmatrix} 0 & 0 \\ 0 & \mu^{-1}I_{N_U} \end{bmatrix} = \begin{bmatrix} 0 & \ldots & 0 & 0 \\ \vdots & \ddots & \vdots & \vdots \\ 0 & \ldots & 0 & 0 \\ 0 & \ldots & 0 & H_k\breve{V}_{N_U} \\ 0 & \ldots & 0 & 0 \\ \vdots & \ddots & \vdots & \vdots \\ 0 & \ldots & 0 & 0 \end{bmatrix}. \quad (20)$$

Thus $$HF_k = \begin{bmatrix} 0 & \cdots & 0 & 0 \\ \vdots & \ddots & \vdots & \vdots \\ 0 & \cdots & 0 & 0 \\ 0 & \cdots & 0 & H_k \breve{V}_{N_U} \\ 0 & \cdots & 0 & 0 \\ \vdots & \ddots & \vdots & \vdots \\ 0 & \cdots & 0 & 0 \end{bmatrix} (H_k \breve{V})^H \quad (21)$$

$$= [\,0\ \cdots\ 0\ \ H_k H_k^H\ \ 0\ \cdots\ 0\,]^H$$

This means that stacking the results of (21) gives:

$$HF = \begin{bmatrix} H_1 H_1^H & \cdots & 0 \\ \vdots & \ddots & \vdots \\ 0 & \cdots & H_{N_U} H_{N_U}^H \end{bmatrix}. \quad (22)$$

This indicates the effective channel $H_{eq}=HF$ is block diagonalised, with the effect that interference between the UEs in the cooperative BSC group is reduced or eliminated.

Figure 6:
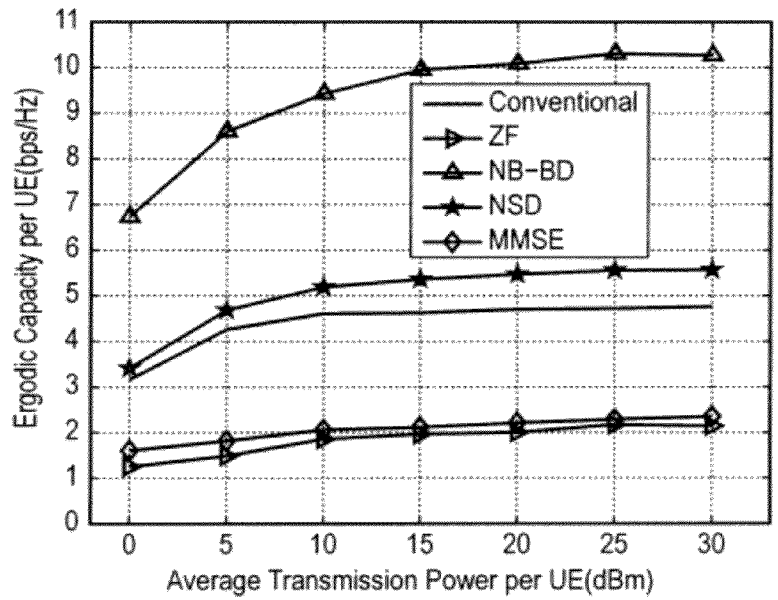
FIG. 6 is a plot comparing the transmission capacity achievable using another embodiment of the invention (the NB-BD embodiment) with the results achievable using the MMSE, ZF, NSD and conventional approaches discussed in Zhang and Dai.

FIG. 6 compares the transmission capacity achievable using the NB-BD embodiment described above with the results achievable using the MMSE, ZF, NSD and conventional approaches discussed in Zhang and Dai. As in FIG. 5, the four lowermost curves plotted in FIG. 6 are, in fact, identical to those shown in FIG. 3 and represent the transmission capacity achieved using the MMSE, ZF, NSD and conventional approaches in Zhang and Dai when inter-group interference is taken into consideration. However, FIG. 6 further shows that the algorithm in the NB-BD embodiment is able to achieve approximately double the bit rate throughput (or more) compared with the NSD approach in Zhang and Dai, and an even greater improvement compared with the other approaches in Zhang and Dai.

Thus, with the algorithm in the NB-BD embodiment, it is again possible to achieve substantial gains using base station cooperation (BSC) despite the impact of inter-group interference or OGI. Furthermore, the algorithm in the NB-BD embodiment has the further advantage of significantly simplifying calculation as it does not require a singular value decomposition (SVD) calculation of the joint channel matrix H. Although, calculation of SVD of a single user's channel $H_k H_k^H$ to cancel inter-data stream interference for one user may not be avoided in this embodiment, such a calculation is simpler than a full SVD of H. Also, the accuracy of such a SVD is easier to maintain if channel estimation error or limited channel feedback effects are considered.

At this point it is useful to describe a scheduler which may be used with the NB-BD embodiment. As those skilled in the art will understand, by including a UE's past average rate into the user selection criterion, a proportional fairness (PF) scheduler can generally achieve fairer transmission rates than a maximum rate scheduler. The scheduler proposed here is therefore a form of PF scheduler.

More specifically, the PF scheduler proposed below for use with the NB-BD embodiment aims to choose the UE with maximum instantaneous supportable rates relative to a user's average rate. To ease the burden of calculation, the scheduling decision may preferably be made dependent on maximum channel norm instead of supported rates. That is, the scheduler may be configured to find the UE that has the maximum channel norm and lowest past average rate instead of supported rate versus past rate. Hereinafter, the ratio of maximum channel norm to lowest past average rate will be denoted $\lambda$.

Due to the nature of joint transmission within a BSC group, any new UE added to the group will affect the supported rate of all other UEs. For this reason, for scheduling purposes, a greedy UE selection process is proposed. Specifically, when choosing the first UE, the scheduler should find the one that has the largest $\lambda$. For the second UE, after obtaining the joint precoding matrices for the two (i.e. first and second) UEs, depending on their channel matrices, the scheduler will calculate the sum norm of effective channels to these two UEs, then the choice can be made on the second UE. A similar selection process may then be carried out for the remainder of the total number of UEs K which are to be served at the same time in a BSC group. Thus, the following scheduler algorithm may be used:

(i) Find the first UE (the one with the strongest channel from amongst the UEs served by the group) by, for each UE, examining the norm of the UE's channel $H_x$ and past average transmission capacity $R_x$ using the equation:

$$c_1 = \underset{x}{\arg\max}\{|H_x|/R_x\} \quad (s1)$$

where the arg max operator returns the set of points of the given argument for which the value of the given expression attains its maximum value;

(ii) Find the second UE from amongst the remaining UEs served by the group using the equation:

$$c_2 = \underset{x}{\arg\max}\{|H_{c_1} T_{c_1}| + |H_x T_x|\}/R_x \quad (s2)$$

where $T=F(\text{diag}(p)^{(1/2)})$ and p is a vector of the transmit powers of the transmitting antennas of the base stations of the group;

(iii) Find the third UE from amongst the then remaining UEs served by the group using the:

$$c_3 = \underset{x}{\arg\max}\{|H_{c_1} T_{c_1}| + |H_{c_2} T_{c_2}| + |H_x T_x|\}/R_x; \quad (s3)$$

(iv) continue to find UEs successively using equations:

$$c_k = \underset{x}{\arg\max}\{|H_{c_1} T_{c_1}| + |H_{c_2} T_{c_2}| + \ldots + |H_{c_{k-1}} T_{c_{k-1}}| + |H_x T_x|\}/R_x \quad (s4)$$

until $c_K$ is found, where K is the number of user equipments served by the group; and (v) calculate the precoding matrices $F_k$ for each of the UEs $c_k$ (k=1, ..., K) using equation (6).

Another embodiment of the invention will now be described. This embodiment relates to maximum eigenmode transmission (MET) and will therefore be referred to as the MET-NBBD embodiment.

One of the concepts underlying the MET-NBBD embodiment is that only one data stream is transmitted to any UE using its dominant eigenmode, regardless of how many antennas there are on the transmitters or receivers. Importantly, this does not necessarily mean that the MET-NBBD embodiment is limited to a single UE system as multiple data steams can be transmitted simultaneously from the transmitter through a number of eigen channels that then reach different UEs at the same time.

In the MET-NBBD embodiment, each data stream will be transmitted on the dominant eigenmode of the channel to a given UE. Because of this, the feedback requirement for UE may be reduced from the full channel matrix to only one eigen-channel vector. This reduction will be more significant when the number of antennas becomes large given the consequent increase this would cause in the dimensions of the full channel matrix. Also, as its name suggests, the MET-NBBD embodiment is related to the NB-BD embodiment described above in that the effective channels obtained in the precoding calculation in the NB-BD embodiment are the dominant eigen channels of UEs.

At this point, one might question, if only one data stream is always transmitted, whether it will be necessary for the system to have transmitters equipped with multiple antennas. Also, what is the benefit of having multiple antennas on the UE? In answer to this, it should be noted firstly that having multiple receiver antennas means multiple eigen-channels are available provided the transmitter also has multiple antennas. This means there is more choice available and is likely to lead to performance gains. The UE may pick the strongest out of the available eigen-channels. Another benefit is that the multiple antennas may be able to perform receiver beamforming to further cancel the interference.

To understand the MET-NBBD embodiment, note that a SVD of the $k^{th}$ UE's channel may be written $H_k = U_k \Sigma_k V_k^H$, where $$U_k = [u_{k_1}, \ldots, u_{k_{N_U}}]$$

is a unitary matrix, $$V_k = [v_{k_1}, \ldots, v_{k_{N_U}}]$$

and $\Sigma_k$ is a diagonal matrix. The $k^{th}$ UE's receiver is given as the first column of $U_k$, namely $u_{k_1}$. The largest eigenvalue in $\Sigma_k$ may be denoted $\sigma_{k_1}$, and the first column of $V_k$ is $V_{k_1}$. The equivalent channel $\Gamma_k$ for the $k^{th}$ UE after the receiver filter $u_{k_1}$ is therefore:

$$\Gamma_k = u_{k_1} H_k \quad (23)$$
$$= \sigma_{k_1} v_{k_1}$$

Applying a precoding equation of the same form as equation (6) gives:

$$F_k = (\tilde{\Gamma}_k^H \tilde{\Gamma}_k + \mu I)^{-1} \Gamma_k^H \quad (24)$$

where $$\tilde{\Gamma}_k = [\Gamma_1^T, \ldots, \Gamma_{k-1}^T, \Gamma_{k+1}^T, \ldots, \Gamma_{N_U}^T]^T. \quad (25)$$

In the MET-NBBD embodiment, because the precoding matrix $F_k$ is calculated using equation (24), it follows that the UE k will be required to feed back the equivalent channel $\Gamma_k$ instead of channel matrix $H_k$. As may be easily recognised, this represents a saving in terms of feedback overhead as the number of bits required to be fed back is significantly reduced.

A scheduler which may be used with the MET-NBBD embodiment may be generally the same as that used with the NB-BD embodiment above, with appropriate substitutions. Hence, the following scheduler algorithm may be used with the MET-NBBD embodiment:

(i) Finding the first UE (the one with the strongest channel from amongst the user equipments served by the group) by, for each UE, examining the norm of its channel $\Gamma_x$ and past average transmission capacity $R_x$ using the equation:

$$c_1 = \mathrm{argmax}_x |\Gamma_x|/R_x; \quad (s1')$$

(ii) Find the second UE from amongst the remaining UEs served by the group using the equation:

$$c_2 = \mathrm{argmax}_x \{|\Gamma_{c_1} T_{c_1}| + |\Gamma_x T_x|\}/R_x \quad (s2')$$

where $T=F(\mathrm{diag}(p)^{(1/2)})$ and p is a vector of the transmit powers of the transmitting antennas of the base stations of the group;

(iii) Find the third UE from amongst the then remaining UEs served by the group using the equation:

$$c_3 = \mathrm{argmax}_x \{|\Gamma_{c_1} T_{c_1}| + |\Gamma_{c_2} T_{c_2}| + |\Gamma_x T_x|\}/R_x; \quad (s3')$$

(iv) Continue to find UEs successively using equations:

$$c_k = \mathrm{argmax}_x \{|\Gamma_{c_1} T_{c_1}| + |\Gamma_{c_2} T_{c_2}| + \ldots + |\Gamma_{c_{k-1}} T_{c_{k-1}}| + |\Gamma_x T_x|\}/R_x \quad (s4')$$

until $c_k$ is found, where K is the number of UEs served by the group; and (v) Calculate the precoding matrices $F_k$ for each of the UEs $c_k(k=1, \ldots, K)$ using equation (24).

Figure 7:
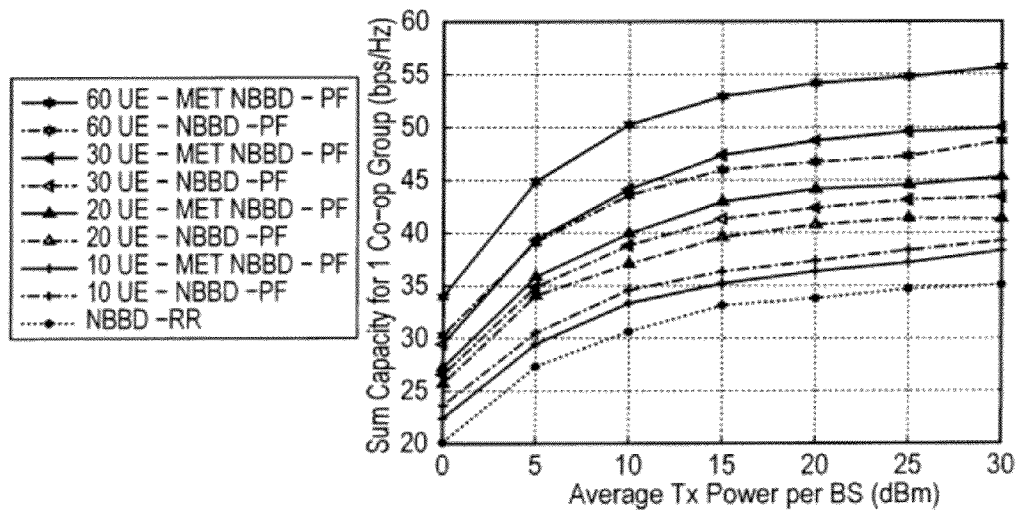
FIG. 7 is a plot comparing performance results obtained using two different embodiments of the invention (the NB-BD embodiment and the MET-NBBD embodiment) using the schedulers described in relation to each embodiment respectively and varying the number of UEs in the BSC group.

FIG. 7 contains a comparison of performance results obtained using the NB-BD and MET-NBBD embodiments, using the respective schedulers described above in relation to each, and varying the number of UEs in the BSC group.

As can be seen from FIG. 7, the MET-NBBD embodiment outperforms the NB-BD embodiment when the number of UEs is more than 10 and typically by approximately 20% to 30% for the same number of UEs. Meanwhile, increasing the number of UEs from 10 to 60 leads to a steady performance gain up to approximately 20% to 50% compared to the MET-NBBD embodiment with 10 UEs. The very lowermost curve plotted in FIG. 7 corresponds to the NB-BD embodiment, but using a Round Robin (RR) scheduler (like for example described in Zhang and Dai) rather than the proportional fairness (PF) scheduler described above.

Another embodiment of the invention will now be described. This embodiment relates to combined transceiver interference cancellation (CTIC) in a multi-BSC group network and will be referred to as the CTIC embodiment.

As explained in relation to the MET-NBBD embodiment above, multiple antennas at the receiver may be used to exploit the eigen channels for receiving just one data stream. However, at this point a question may be posed, namely can the receiver utilize the multiple antennas to perform receiver beamforming to further cancel interference?

In the previous embodiments discussed above, the interference cancellation is the responsibility of the BSC group. For example, the MET-NBBD and NB-BD embodiments utilise block diagonalisation of the channel matrix to reduce crosstalk. However, whilst diagonalising the channel matrices may reduce interference associated with crosstalk, those skilled in the art will recognise that it may also involve a compromise between interference cancellation and signal strength.

The CTIC embodiment therefore takes a slightly different approach. That is, to cancel only part of the crosstalk-related interference (so that some interference between selected UEs is not explicitly cancelled), but at the same time, by doing so, enhance signal strength and thereby further improve system performance. To do this, the CTIC embodiment utilises receiver beamforming.

From equation (1) above, it may be recognised that the signal received by UE k is $$t_k = H_k T_k s_k + n_k = \tilde{H}_k s_k + n_k \quad (26)$$

where $\tilde{H}_k = H_k T_k$.

If we apply a receiver filter $$R_k = W_h^{-1} \tilde{H}_k \quad (27)$$

the signal received becomes $$R_k^H y_k = \tilde{H}_k^H W_k^{-1} \tilde{H}_k s_k + \tilde{H}_k^H W_k^{-1} n_k \quad (28)$$
$$= \ddot{H}_k s_k + \ddot{z}_k$$

where $\ddot{H}_k = \tilde{H}_k^H W_k^{-1} \tilde{H}_k$ and $\ddot{z}_k = \tilde{H}_k^H W_k^{-1} n_k$.

The processing in the CTIC embodiment is similar to that of the MET-NBBD embodiment described above. However, one significant difference is that, in the CTIC embodiment, multiple UEs are precoded together and the interference between those UEs is not completely cancelled. To simplify the analysis here, and for the purpose of explaining the CTIC embodiment, it will be assumed that two UEs are precoded together, although it will of course be recognised that it may also be possible to precode a greater number of UEs together.

The SVD of $\ddot{H}_k$ in equation (28) above is $\ddot{H}_k = \ddot{U}_k \ddot{\Sigma}_k \ddot{V}_k^H$. By denoting the first column of $\ddot{U}_k$ as $\ddot{u}_k$, the largest value of $\ddot{\Sigma}_k$ as $\ddot{\sigma}_{k_1}$ and the first column of $\ddot{V}_k$ as $\ddot{v}_{k_1}$, then after applying the receiver filter as in equation (28) above and the receiver detector $\ddot{u}_{k_1}$, the signal received at UE k becomes $$\ddot{u}_{k_1} R_k^H y_k = \ddot{u}_{k_1} \ddot{H}_k s_k + \ddot{u}_{k_1} \ddot{z}_k \quad (29)$$
$$= \ddot{\Gamma}_k s_k + \ddot{u}_{k_1} \ddot{z}_k$$

where $\ddot{\Gamma}_k = \ddot{\sigma}_{k_1} \ddot{v}_{k_1}$.

From equation (29) above, $\ddot{\Gamma}_k$ may be treated as the effective channel to UE k in the CTIC embodiment, and as mentioned above, in the CTIC embodiment described here, the precoder precodes two UEs at a time. Let UE j be the partner UE to UE k and the let channel of UE j be $\ddot{\Gamma}_j$. From this, the joint channel to UE pair k and j is:

$$\ddot{\Gamma}_{k|j} = [\ddot{\Gamma}_k, \ddot{\Gamma}_j]. \quad (30)$$

The joint channel $\ddot{\Gamma}_{k|j}$ may be assigned the new notation $\Omega_l = \ddot{\Gamma}_{k|j}$, where it is assumed that the UE pair comprising UEs j and k is the $l^{th}$ pair of UEs to be precoded. The precoder for the $l^{th}$ pair of UEs may be defined in a manner similar to equations (6) and (24), that is:

$$F_{\bar{l}} = (\tilde{\Psi}_{\bar{l}}^H \tilde{\Psi}_{\bar{l}} + \mu I)^{-1} \Psi_{\bar{l}}^H \quad (31)$$

where $\tilde{\Psi}$ has a similar definition to equations (6') and (25) (i.e. $\tilde{\Psi}_{\bar{l}} = [\Psi_1^T, \ldots, \Psi_{l-1}^T, \Psi_{l+1}^T, \ldots, \Psi_L^T]^T$) and represents the effective channels to other pairs of UEs that are going to be served. Note therefore that, as for equations (6') and (25), the matrix $\tilde{\Psi}$ does not include the joint channel matrix $\Psi_l$ of the UE pair l.

A scheduler which may be used with the CTIC embodiment may be generally the same as the ones described for the NB-BD and MET-NBBD embodiments above, with appropriate adaptation for the fact that UEs are precoded in pairs in the CTIC embodiment. Hence, in the CTIC embodiment, the following scheduler algorithm may be used:

(i) Find the first UE (the one with the strongest channel from amongst the UEs served by the group) by, for each UE, examining the norm of its channel $\Gamma_x$ and past average transmission capacity $R_x$ using the equation:

$$c_1 = \underset{x}{\operatorname{argmax}} |\Gamma_x| / R_x; \quad (s1'')$$

(ii) Find the second UE from amongst the remaining UEs served by the group using the equation:

$$c_2 = \underset{x}{\operatorname{argmax}} \{|\Gamma_{c_1} T_{c_1}| + |\Gamma_x T_x|\} / R_x \quad (s2'')$$

where $T = F(\operatorname{diag}(p)^{(1/2)})$ and p is a vector of the transmit powers of the transmitting antennas of the base stations of the group;

(iii) Find the third UE from amongst the then remaining UEs served by the group using the equation:

$$c_3 = \underset{x}{\operatorname{argmax}} \{|\Gamma_{c_1} T_{c_1}| + |\Gamma_{c_2} T_{c_2}| + |\Gamma_x T_x|\} / R_x; \quad (s3'')$$

(iv) Continue to find UEs successively using equations:

$$c_k = \underset{x}{\operatorname{argmax}} \{|\Gamma_{c_1} T_{c_1}| + |\Gamma_{c_2} T_{c_2}| + \ldots + |\Gamma_{c_{k-1}} T_{c_{k-1}}| + |\Gamma_x T_x|\} / R_x \quad (s4'')$$

until $c_K$ is found, where K is the number of user equipments served by the group;

(v) Find a UE to form a pair with $c_1$ by finding the UE $c_x$ whose channel provides the largest cross correlation with the channel of $c_1$ using the equation:

$$c_x = \underset{x}{\operatorname{argmax}} |\Gamma_{c_1}^H \Gamma_{c_x}| \quad (s5'')$$

(vi) Find, in the same way, a UE from amongst the remaining UEs to form a pair with each of $c_2, c_3, \ldots, c_K$; and (vii) Calculate the precoding matrices $F_l$ for each of the user equipment pairs using equation (31).

Figure 8:
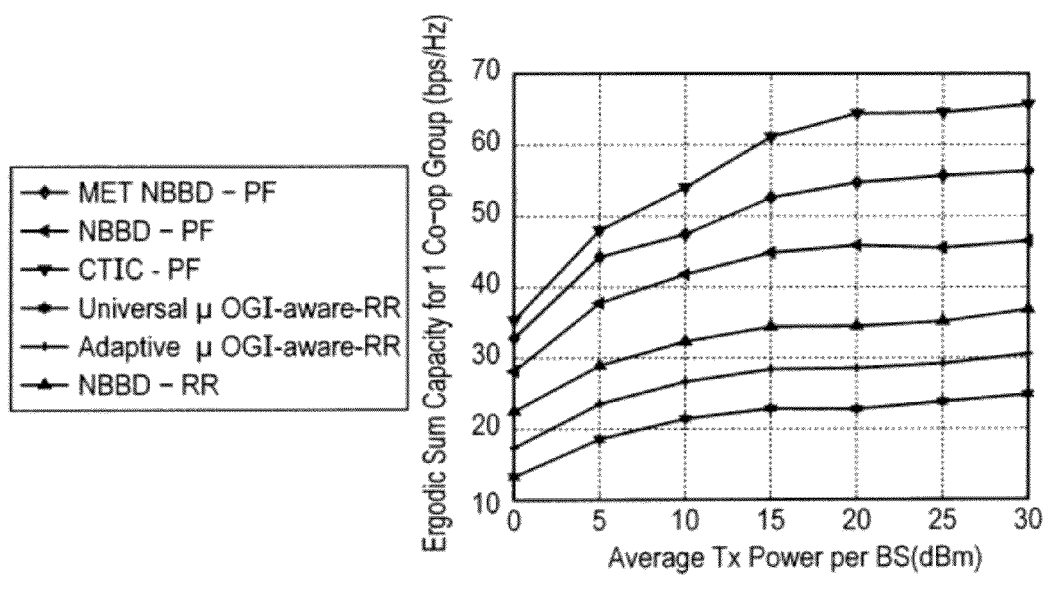
FIG. 8 is a plot comparing performance results obtained using each of the embodiments (the universal-µ and adaptive-µ variants of the OGI-aware embodiment, and the NB-BD, MET-NBBD and CTIC embodiments).

FIG. 8 contains a comparison of performance results obtained using each of the embodiments described above, namely the universal-μ and adaptive-μ variants of the OGI-aware embodiment, and the NB-BD, MET-NBBD and CTIC embodiments. To obtain the results for the universal-µ and adaptive-µ variants of the OGI-aware embodiment, a round robin (RR) scheduler similar to that described in Zhang and Dai was used. A curve is also plotted with results for the NB-BD embodiment using a RR scheduler. To obtain the results illustrated in the other curves in FIG. 8, the schedulers used were the various proportional fairness (PF) schedulers described above in connection with the relevant embodiments respectively.

To summarise the results shown in FIG. 8, take (as an example) the respective results plotted for the various embodiments/schedulers for an average transmission power per BS of 30 dBm (i.e. consider the points on each curve respectively for Tx power per BS=30 dBm on the x-axis):

- the universal-µ and adaptive-µ variants of the OGI-aware embodiment achieve a sum rate of approximately 25 and 30 bps/Hz respectively;
- the NB-BD embodiment, when a RR scheduler is used, achieves a sum rate of approximately 36 bps/Hz, but when the PF scheduler described above for the NB-BD embodiment is used instead the performance improves to a sum rate of approximately 46 bps/Hz (this improvement is obtained by exploiting the scheduling gain);
- the MET-NBBD embodiment, using the PF scheduler described in connection with that embodiment above, achieves a result of 55 bps/Hz; and
- the CTIC embodiment, when using the PF scheduler described in connection with that embodiment above, achieves a sum rate of approximately 66 bps/Hz.

In the simulations, the results of which are shown in FIG. 8, the number of UE per cell was 60 in each case.

In any of the aspects or embodiments of the invention described above, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein.

A computer program embodying the invention may be stored on a computer-readable medium including a tangible and/or non-transitory recording medium, or it could, for example, be in the form of a signal such as a downloadable data signal provided from an Internet website, or it could be in any other form.

It is to be clearly understood that various changes and/or modifications may be made to the particular embodiments just described without departing from the spirit and scope of the invention.

The invention claimed is:

1. A method for use in a multiple-input multiple-output wireless communication system in which:
   - a plurality of base stations are provided each of which can transmit signals to, and receive signals transmitted from, one or more user equipments;
   - the base stations are organized into a plurality of groups;
   - in a given group of base stations serving one or more user equipments, those serving base stations coordinate with each other to simultaneously transmit signals to the one or more served user equipments, and one or more of the served user equipments feed back information to one or more of those serving base stations, wherein said information incorporates inter-group noise information related to interference between different base station groups, the method comprising:
   - processing signals for simultaneous transmission from base stations of a group of the plurality of groups to one or more user equipments served by that group, said processing using the inter-group noise information fed back to the base station(s) of that group to improve transmission capacity, wherein
   - a noise-related parameter is defined which incorporates the inter-group noise information which, includes noise power $\tilde{I}_0$ which represents the component of the total power of the noise in the system that is associated with inter-group interference,
   - the processing involves using the noise-related parameter to precode signals for simultaneous transmission from base stations of a group to one or more user equipments served by that group,
   - information fed back by the one or more of the served user equipments further includes noise power $\tilde{N}_0$ which represents the component of the total power of the noise in the system that is associated with background noise,
   - the noise-related parameter, µ, is calculated using an equation equivalent to the following:

$$\mu = \frac{\tilde{I}_0 + \tilde{N}_0}{\bar{p}_k} \beta$$

where $\bar{p}_k$ represents the mean transmit power of transmitting antennas of the base stations of the group and $\beta$ represents a parameter that can be varied to give the value of µ which enables the precoding to yield a high improvement in system performance,
   $N_B$ represents the number of base stations in a group, $N_U$ represents the number of user equipments served by the base stations of that group in a given time slot, $N_R$ represents the number of antennas on each user equipment, $N_T$ represents the number of transmitter antennas on each base station in the group, and a channel between the base stations of the group and the user equipments served by the group is represented by a channel matrix $H \in \mathbb{C}^{N_R N_U \times N_T N_B}$, and
   the precoding of signals for simultaneous transmission from the base stations of the group to one or more user equipments served by the group involves calculating a precoding matrix F using an equation equivalent to the following:

$$F = H^H (HH^H + \mu I)^{-1}.$$

2. A method according to claim 1, wherein:
   the information fed back by one or more of the user equipments served by a given group of base stations also includes intra-group noise information related to interference in said given group which is associated with transmissions between said served user equipments and different individual serving base stations of said group, and
   the processing of signals for simultaneous transmission from base stations of the group to one or more user equipments served by that group also uses the intra-group noise information.

3. A method as claimed in claim 1, wherein:
   $H = [H_1^T, \ldots, H_{N_U}^T]^T$ and $H_k (k \in [1, \ldots, N_U])$ represents the channel from the $N_T N_B$ transmitter antennas to the $N_R$ antennas of a user equipment k, and
   the precoding of signals for simultaneous transmission from the base stations of the group to a user equipment k served by the group involves calculating a precoding matrix $F_k$ using an equation equivalent to the following:

$$F_k(\check{H}_k^H \check{H}_k + \mu I)^{-1} H_k^H$$

where $$\check{H}_k = [H_1^T, \ldots, H_{k-1}^T, H_{k+1}^T, \ldots, H_{N_U}^T]^T.$$

4. A method as claimed in claim 3, wherein scheduling of user equipments is performed by:
(i) finding a first user equipment having the strongest channel from amongst the user equipments served by the group by, for each user equipment, examining the norm of its channel $H_x$ and past average transmission capacity $R_x$ using an equation equivalent to:

$$c_1 = \underset{x}{\operatorname{argmax}} |H_x| / R_x;$$

(ii) finding a second user equipment from amongst the remaining user equipments served by the group using an equation equivalent to:

$$c_2 = \underset{x}{\operatorname{argmax}} \{|H_{c_1} T_{c_1}| + |H_x T_x|\} / R_x$$

where $T = F(\operatorname{diag}(p)^{(1/2)})$ and p is a vector representing the transmit powers of the transmitting antennas of the base stations of the group;

(iii) finding a third user equipment from amongst the then remaining user equipments served by the group using an equation equivalent to:

$$c_3 = \underset{x}{\operatorname{argmax}} \{|H_{c_1} T_{c_1}| + |H_{c_2} T_{c_2}| + |H_x T_x|\} / R_x$$

(iv) continuing to find user equipments successively using equations equivalent to:

$$c_k = \underset{x}{\operatorname{argmax}} \{|H_{c_1} T_{c_1}| + |H_{c_2} T_{c_2}| + \ldots + |H_{c_{k-1}} T_{c_{k-1}}| + |H_x T_x|\} / R_x$$

until $c_K$ is found, where K represents the number of user equipments served by the group; and
(v) calculating the precoding matrices $F_k$ for each of the user equipments $c_k$ (k=1, ..., K).

5. A method as claimed in claim 1, wherein:
$H = [H_1^T, \ldots, H_{N_U}^T]^T$ and $H_k (k \in [1, \ldots, N_U])$ represents the channel from the $N_T N_B$ transmitter antennas to the $N_R$ antennas of a user equipment k served by the group, a singular value decomposition of $H_k$ is $H_k = U_k \Sigma_k V_k$ where $$U_k = [u_{k_1}, \ldots, u_{k_{N_U}}]$$

and $$V_k = [v_{k_1}, \ldots, v_{k_{N_U}}],$$

a receiver filter of user equipment k is $u_{k_1}$, the largest eigenvalue in $\Sigma_k$ represented by $\sigma_{k_1}$, and an equivalent channel $\Gamma_k$ for user equipment k after the receiver filter $u_{k_1}$ is applied represented by $\Gamma_k = u_{k_1} H_k = \sigma_{k_1} v_{k_1}$, and the precoding of signals for simultaneous transmission from the base stations of the group to the user equipment k involves calculating a precoding matrix $F_k$ using an equation equivalent to the following:

$$F_k(\check{H}_k^H \check{H}_k + \mu I)^{-1} H_k^H$$

where $\check{\Gamma}_k = [\Gamma_1^T, \ldots, \Gamma_{k-1}^T, \Gamma_{k+1}^T, \ldots, \Gamma_N^T]^T$.

6. A method as claimed in claim 5, wherein scheduling of user equipments is performed by:
(i) finding a first user equipment having the strongest channel from amongst the user equipments served by the group by, for each user equipment, examining the norm of its channel $\Gamma_x$ and past average transmission capacity $R_x$ using an equation equivalent to:

$$c_1 = \underset{x}{\operatorname{argmax}} |\Gamma_x| / R_x$$

(ii) finding a second user equipment from amongst the remaining user equipments served by the group using an equation equivalent to:

$$c_2 = \underset{x}{\operatorname{argmax}} \{|\Gamma_{c_1} T_{c_1}| + |\Gamma_x T_x|\} / R_x$$

where $T = F(\operatorname{diag}(p)^{(1/2)})$ and p is a vector representing the transmit powers of the transmitting antennas of the base stations of the group;

(iii) finding a third user equipment from amongst the then remaining user equipments served by the group using an equation equivalent to:

$$c_3 = \underset{x}{\operatorname{argmax}} \{|\Gamma_{c_1} T_{c_1}| + |\Gamma_{c_2} T_{c_2}| + |\Gamma_x T_x|\} / R_x$$

(iv) continuing to find user equipments successively using equations equivalent to:

$$c_k = \underset{x}{\operatorname{argmax}} \{|\Gamma_{c_1} T_{c_1}| + |\Gamma_{c_2} T_{c_2}| + \ldots + |\Gamma_{c_{k-1}} T_{c_{k-1}}| + |\Gamma_x T_x|\} / R_x$$

until $c_K$ is found, where K represents the number of user equipments served by the group; and
(v) calculating the precoding matrices $F_k$ for each of the user equipments $c_k$ (k=1, ..., K).

7. A method claimed in claim 1, wherein:
where $H = [H_1^T, \ldots, H_{N_U}^T]^T$ and $H_k (k \in [1, \ldots, N_U])$ represents the channel from the $N_T N_B$ transmitter antennas to the $N_R$ antennas of a user equipment k served by the group, $T \in \mathbb{C}^{N_T N_B \times N_T N_B}$ represents an equivalent precoding matrix, $W_k$ is the covariance of the total noise affecting a user equipment k, $\ddot{H}_k = (H_k T_k)^H W_k^{-1} H_k T_k$ represents an equivalent channel matrix, a singular value decomposition of $\ddot{H}_k$ is $\ddot{H}_k = \ddot{U}_k \ddot{\Sigma}_k \ddot{V}_k^H$ where $$\ddot{U}_k = [\ddot{u}_{k_1}, \ldots, \ddot{u}_{k_{N_U}}] \text{ and } \ddot{V}_k = [\ddot{v}_{k_1}, \ldots, \ddot{v}_{k_{N_U}}],$$

a receiver filter of user equipment k is $\ddot{u}_{k_1}$, the largest eigenvalue in $\ddot{\Sigma}_k$ is represented by $\ddot{\sigma}_{k_1}$, an equivalent channel $\ddot{\Gamma}_k$ for user equipment k after the receiver filter $\ddot{u}_{k_1}$ is applied is represented by $\ddot{\Gamma}_k = \ddot{u}_{k_1} \ddot{v}_{k_1}$ and therefore an equivalent channel for a pair of user equipments k and j is $\ddot{L}_{k|j} = [\ddot{\Gamma}_k, \ddot{\Gamma}_j] = \Psi_l$ where user equipments k and j represent an $l^{th}$ pair of user equipments, and the precoding of signals for simultaneous transmission from the base stations of the group to the user equipment pair l involves calculating a precoding matrix $F_l$ using an equation equivalent to:

$$F_l = (\Psi_l^H \Psi_l + \mu I)^{-1} \Psi_l^H$$

where $$\bar{\Psi}_l = [\Psi_1^T, \ldots, \Psi_{l-1}^T, \Psi_{l+1}^T, \ldots, \Psi_L^T]^T.$$

8. A method as claimed in claim 7, wherein scheduling of user equipments is performed by:

(i) finding a first user equipment having the strongest channel from amongst the user equipments served by the group by, for each user equipment, examining the norm of its channel $\Gamma_x$ and past average transmission capacity $R_x$ using an equation equivalent to:

$$c_1 = \underset{x}{\operatorname{argmax}} |\Gamma_x| / R_x$$

(ii) finding a second user equipment from amongst the remaining user equipments served by the group using an equation equivalent to:

$$c_2 = \underset{x}{\operatorname{argmax}} \{|\Gamma_{c_1} T_{c_1}| + |\Gamma_x T_x|\} / R_x$$

where $T = F(\operatorname{diag}(p)^{(1/2)})$ and p is a vector representing the transmit powers of the transmitting antennas of the base stations of the group (iii) finding a third user equipment from amongst the then remaining user equipments served by the group using an equation equivalent to:

$$c_3 = \underset{x}{\operatorname{argmax}} \{|\Gamma_{c_1} T_{c_1}| + |\Gamma_{c_2} T_{c_2}| + |\Gamma_x T_x|\} / R_x$$

(iv) continuing to find user equipments successively using equations equivalent to:

$$c_k = \underset{x}{\operatorname{argmax}} \{|\Gamma_{c_1} T_{c_1}| + |\Gamma_{c_2} T_{c_2}| + \ldots + |\Gamma_{c_{k-1}} T_{c_{k-1}}| + |\Gamma_x T_x|\} / R_x u$$

until $c_K$ is found, where K represents the number of user equipments served by the group;

(v) finding a user equipment to form a pair with $c_1$ by finding the user equipment $c_x$ whose channel provides the largest cross correlation with the channel of $c_1$ using an equation equivalent to:

$$c_x = \underset{x}{\operatorname{argmax}} |\Gamma_{c_1}^H \Gamma_{c_x}|$$

(vi) finding, in the same way, a user equipment from amongst the remaining user equipments to form a pair with each of $c_2, c_3, \ldots, c_K$;

(vii) calculating the precoding matrices $F_l$ for each of the user equipment pairs.

9. A method according to claim 1 wherein, in order to find the value of the noise-related μ:

(i) a number of candidate values of β are selected;
(ii) for each selected candidate β value, a trial value for μ and a corresponding trial precoding matrix F are calculated;
(iii) for each trial μ value and trial precoding matrix F thus calculated, a system transmission capacity is calculated; and
(iv) the trial μ value that delivered the greatest calculated system transmission capacity is selected as the value for μ.

10. A method as claimed in claim 1, wherein precoding of signals for simultaneous transmission from base stations of the group to one or more user equipments served by that group is performed by, or at, one or more of those base stations.

11. A multiple-input multiple-output wireless communication system comprising:

a plurality of base stations, each of which can transmit signals to, and receive signals transmitted from, one or more user equipments, wherein the base stations are organized into a plurality of groups; and in a given group of base stations serving one or more user equipments, those serving base stations coordinate with each other to simultaneously transmit signals to the one or more served user equipments, and one or more of the served user equipments feed back information to one or more of those serving base stations, said information incorporating inter-group noise information related to interference between different base station groups;

wherein signals are processed for simultaneous transmission from base stations of a group to one or more user equipments served by that group and said processing uses the inter-group noise information fed back to the base station(s) of that group to improve transmission capacity, wherein a noise-related parameter is defined which incorporates the inter-group noise information which, includes noise power $\tilde{I}_0$ which represents the component of the total power of the noise in the system that is associated with inter-group interference, the processing involves using the noise-related parameter to precode signals for simultaneous transmission from base stations of a group to one or more user equipments served by that group, information fed back by the one or more of the served user equipments further includes noise power $\tilde{N}_0$ which represents the component of the total power of the noise in the system that is associated with background noise, the noise-related parameter, $\mu$, is calculated using an equation equivalent to the following:

$$\mu = \frac{\tilde{I}_0 + \tilde{N}_0}{\bar{p}_k}\beta$$

where $\bar{p}_k$ represents the mean transmit power of transmitting antennas of the base stations of the group and $\beta$ represents a parameter that can be varied to give the value of $\mu$ which enables the precoding to yield a high improvement in system performance, $N_B$ represents the number of base stations in a group, $N_U$ represents the number of user equipments served by the base stations of that group in a given time slot, $N_R$ represents the number of antennas on each user equipment, $N_T$ represents the number of transmitter antennas on each base station in the group, and a channel between the base stations of the group and the user equipments served by the group is represented by a channel matrix $H \in \mathbb{C}^{N_R N_U \times N_T N_B}$, and the precoding of signals for simultaneous transmission from the base stations of the group to one or more user equipments served by the group involves calculating a precoding matrix F using an equation equivalent to the following:

$F = H^H(HH^H + \mu I)^{-1}$.

12. An apparatus for use in a multiple-input multiple-output wireless communication system, the system comprising:

a plurality of base stations, each of which can transmit signals to, and receive signals transmitted from, one or more user equipments, wherein the base stations are organized into a plurality of groups; and in a given group of base stations serving one or more user equipments, those serving base stations coordinate with each other to simultaneously transmit signals to the one or more served user equipments, and one or more of the served user equipments feed back information to one or more of those serving base stations, said information incorporating inter-group noise information related to interference between different base station groups;

the apparatus comprising:

a processor which processes signals for simultaneous transmission from base stations of a group to one or more user equipments served by that group and, said processing uses the inter-group noise information fed back to the base station(s) of that group to improve transmission capacity, wherein a noise-related parameter is defined which incorporates the inter-group noise information which, includes noise power $\tilde{I}_0$ which represents the component of the total power of the noise in the system that is associated with inter-group interference, the processing involves using the noise-related parameter to precode signals for simultaneous transmission from base stations of a group to one or more user equipments served by that group, information fed back by the one or more of the served user equipments further includes noise power $\tilde{N}_0$ which represents the component of the total power of the noise in the system that is associated with background noise, the noise-related parameter, $\mu$, is calculated using an equation equivalent to the following:

$$\mu = \frac{\tilde{I}_0 + \tilde{N}_0}{\bar{p}_k}\beta$$

where $\bar{p}_k$ represents the mean transmit power of transmitting antennas of the base stations of the group and $\beta$ represents a parameter that can be varied to give the value of $\mu$ which enables the precoding to yield a high improvement in system performance, $N_B$ represents the number of base stations in a group, $N_U$ represents the number of user equipments served by the base stations of that group in a given time slot, $N_R$ represents the number of antennas on each user equipment, $N_T$ represents the number of transmitter antennas on each base station in the group, and a channel between the base stations of the group and the user equipments served by the group is represented by a channel matrix $H \in \mathbb{C}^{N_R N_U \times N_T N_B}$, and the precoding of signals for simultaneous transmission from the base stations of the group to one or more user equipments served by the group involves calculating a precoding matrix F using an equation equivalent to the following:

$F = H^H(HH^H + \mu I)^{31\ 1}$.

13. A non-transitory computer-readable medium storing a computer program which, when executed on a computer operating in a multiple-input multiple-output wireless communication system, causes the computer to perform the method as claimed in claim 1.

* * * * *

UNITED STATES PATENT AND TRADEMARK OFFICE
CERTIFICATE OF CORRECTION

PATENT NO. : 8,565,175 B2  
APPLICATION NO. : 13/226074  
DATED : October 22, 2013  
INVENTOR(S) : Yiwei Fang and John Thompson Page 1 of 1

It is certified that error appears in the above-identified patent and that said Letters Patent is hereby corrected as shown below:

Title Page: Item 73  
The Assignee appears as "Fujitsu Limited, Kawasaki (JP)" but should appear as "Fujitsu Limited, Kawasaki (JP); The University of Edinburgh, Edinburgh (GB)" instead.

Signed and Sealed this  
Twenty-fifth Day of March, 2014

Michelle K. Lee  
*Deputy Director of the United States Patent and Trademark Office*